(12) United States Patent
Saito et al.

(10) Patent No.: US 10,061,547 B2
(45) Date of Patent: Aug. 28, 2018

(54) RELAY DEVICE, IMAGE PROCESSING DEVICE, SERVER, AND SYSTEM COMPRISING IMAGE PROCESSING DEVICE, RELAY DEVICE AND SERVER

(71) Applicant: BROTHER KOGYO KABUSHIKI KAISHA, Nagoya-shi, Aichi-ken (JP)

(72) Inventors: Ken Saito, Tokoname (JP); Tomohiko Hasegawa, Okazaki (JP)

(73) Assignee: BROTHER KOGYO KABUSHIKI KAISHA, Nagoya-Shi, Aichi-Ken (JP)

( * ) Notice: Subject to any disclaimer, the term of this patent is extended or adjusted under 35 U.S.C. 154(b) by 83 days.

(21) Appl. No.: 14/868,993

(22) Filed: Sep. 29, 2015

(65) Prior Publication Data
US 2017/0039006 A1  Feb. 9, 2017

(30) Foreign Application Priority Data

Aug. 7, 2015  (JP) .................................. 2015-157270
Aug. 7, 2015  (JP) .................................. 2015-157305

(51) Int. Cl.
*G06F 3/12* (2006.01)
*H04N 1/00* (2006.01)
*H04N 1/413* (2006.01)

(52) U.S. Cl.
CPC .......... *G06F 3/1213* (2013.01); *G06F 3/1257* (2013.01); *G06F 3/1265* (2013.01); *G06F 3/1285* (2013.01); *H04N 1/00244* (2013.01); *H04N 1/413* (2013.01); *H04N 2201/0039* (2013.01); *H04N 2201/0044* (2013.01);

(Continued)

(58) Field of Classification Search
USPC ....................................................... 358/1.14
See application file for complete search history.

(56) References Cited

U.S. PATENT DOCUMENTS

2010/0053708 A1* 3/2010 Igarashi ............. H04N 1/00222
358/518
2011/0299111 A1* 12/2011 Hasegawa ............ G06K 15/007
358/1.15

(Continued)

FOREIGN PATENT DOCUMENTS

JP  2008-229993 A  10/2008
JP  2015-41968 A   3/2015

*Primary Examiner* — Neil R McLean
*Assistant Examiner* — Darryl V Dottin
(74) *Attorney, Agent, or Firm* — Merchant & Gould P.C.

(57) ABSTRACT

A relay device may receive first information and second information from the image processing device. The relay device may select one of a first processing and a second processing based on at least one of the received first information and the received second information. The relay device may send, to an image processing device, first instruction information causing the image processing device to execute the first processing when the first processing is selected. The relay device may send, to the image processing device, second instruction information causing the image processing device to execute the second processing when the second processing is selected. The relay device may receive the first image data according to the first instruction information or the second instruction information. The relay device may generate second image data by executing the selected image processing on the first image data that has been received.

22 Claims, 10 Drawing Sheets

(52) U.S. Cl.
CPC ............... *H04N 2201/0081* (2013.01); *H04N 2201/0094* (2013.01)

(56) References Cited

U.S. PATENT DOCUMENTS

2015/0055177 A1* 2/2015 Saito ..................... G06F 3/1206
358/1.15
2015/0103383 A1* 4/2015 Dowling ............ H04N 1/00225
358/402

* cited by examiner

US 10,061,547 B2

RELAY DEVICE, IMAGE PROCESSING DEVICE, SERVER, AND SYSTEM COMPRISING IMAGE PROCESSING DEVICE, RELAY DEVICE AND SERVER

CROSS-REFERENCE TO RELATED APPLICATION

This application claims priority to Japanese Patent Application No. 2015-157270, filed on Aug. 7, 2015, and Japanese Patent Application No. 2015-157305, filed on Aug. 7, 2015, the contents of which are hereby incorporated by reference into the present application.

TECHNICAL FIELD

The present specification discloses a relaying device connected with an image processing device via a network.

DESCRIPTION OF RELATED ART

A known image processing device has a web browser integrated therein, and has a function for downloading and printing a web page. Further, the image processing device has a function for uploading scan data, which was created by scanning a document which has a Joint Photographic Experts Group (referred to as JPEG) format, to a web server without performing any processing.

SUMMARY

There are cases where the uploading and downloading of image data takes time. This is not desirable since the user has to wait when communications time is long.

One technique disclosed in the present application is a relay device configured to electrically connect with an image processing device and a server via a network. The relay device may comprise: a network interface; a processor coupled to the network interface; and a memory storing computer-readable instructions. The computer-readable instructions, when executed by the processor, may cause the relay device to perform receiving first information and second information from the image processing device via the network interface. The first information may be information identifying a selected image processing. The selected image processing may be at least one type of image processing selected in the image processing device from among plural types of image processing that are to be executed on first image data outputted from the image processing device. The second information being information including plural kinds of information related to the image processing device. The computer-readable instructions may cause the relay device to perform selecting one of a first processing and a second processing based on at least one of the received first information and the received second information. The first processing may be a processing in which the image processing device sends the first image data to the relay device via the server. The second processing may be a processing in which the image processing device sends the first image data to the relay device not via the server. The computer-readable instructions may cause the relay device to perform sending, to the image processing device, first instruction information causing the image processing device to execute the first processing when the first processing is selected. The computer-readable instructions may cause the relay device to perform sending, to the image processing device, second instruction information causing the image processing device to execute the second processing when the second processing is selected. The computer-readable instructions may cause the relay device to perform receiving the first image data from the image processing device via the server after the sending of the first instruction information, or receiving the first image data from the image processing device not via the server after the sending of the second instruction information. The computer-readable instructions may cause the relay device to perform generating second image data by executing the selected image processing on the first image data that has been received.

EMBODIMENT (System Configuration)

Figure 1:
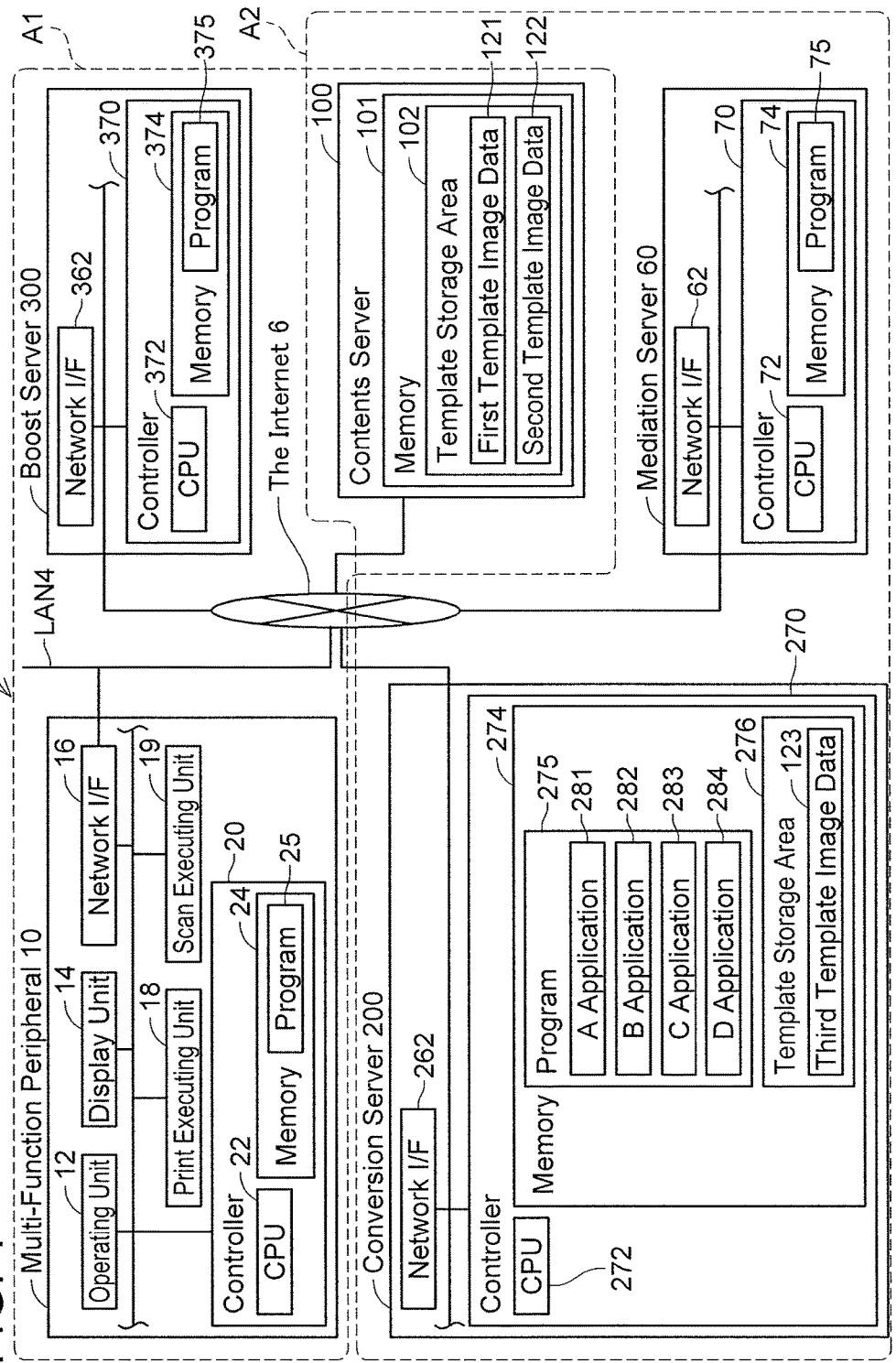
FIG. 1 shows the configuration of a communication system.
Figure 2:
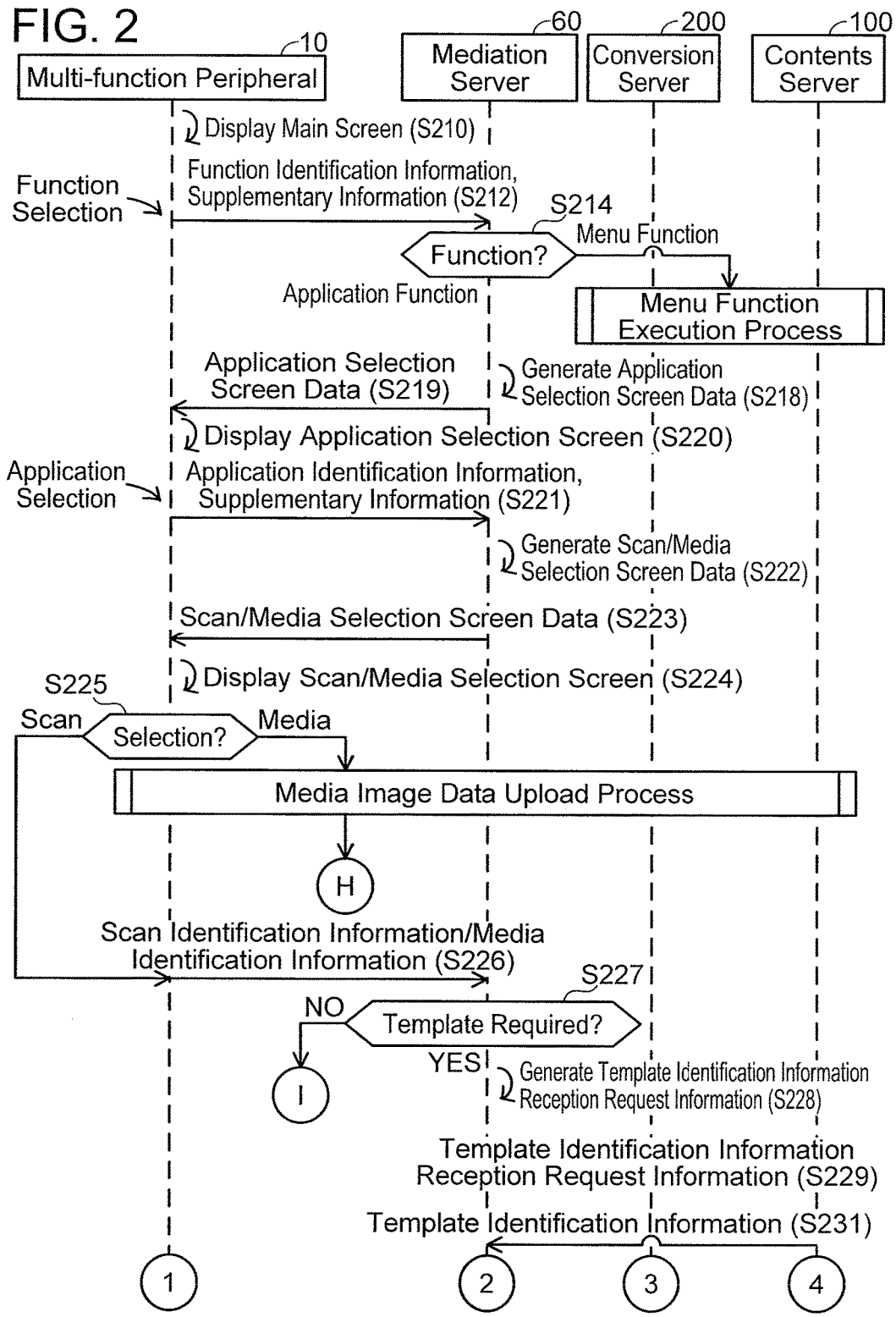
FIG. 2 shows a sequence diagram of various processing executed by each device.
Figure 3:
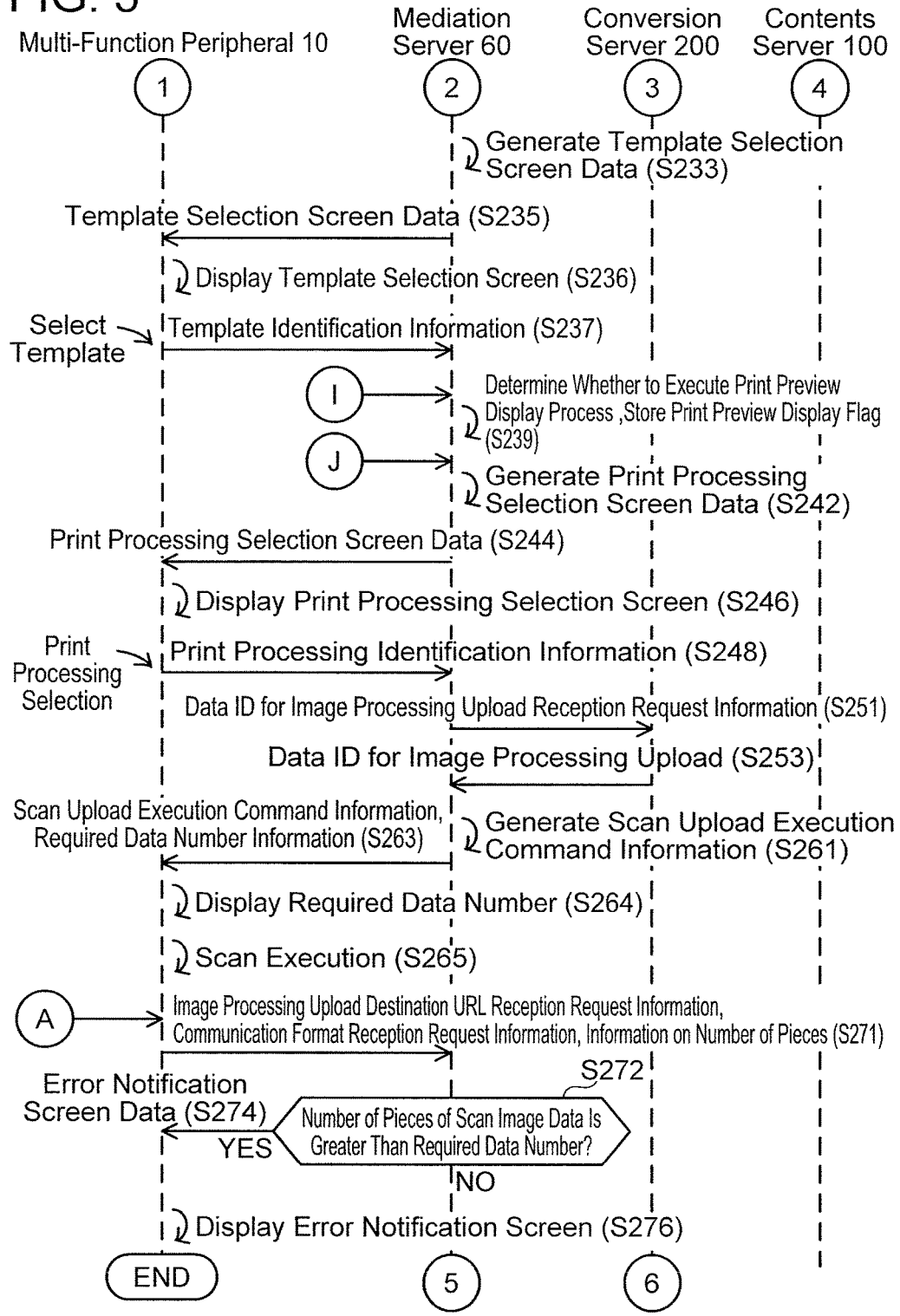
FIG. 3 shows a sequence diagram of various processing executed by each device.
Figure 4:
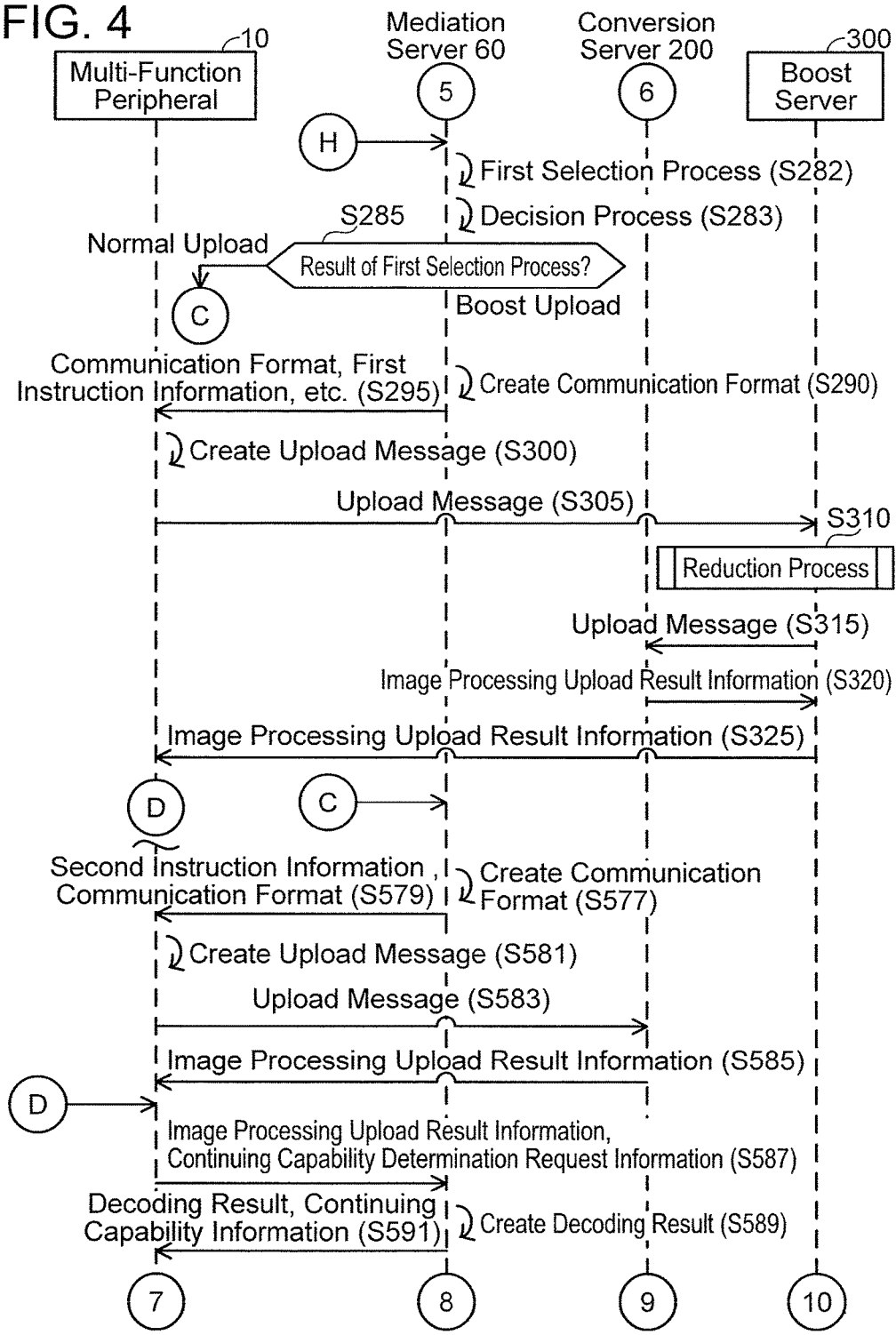
FIG. 4 shows a sequence diagram of various processing executed by each device.
Figure 5:
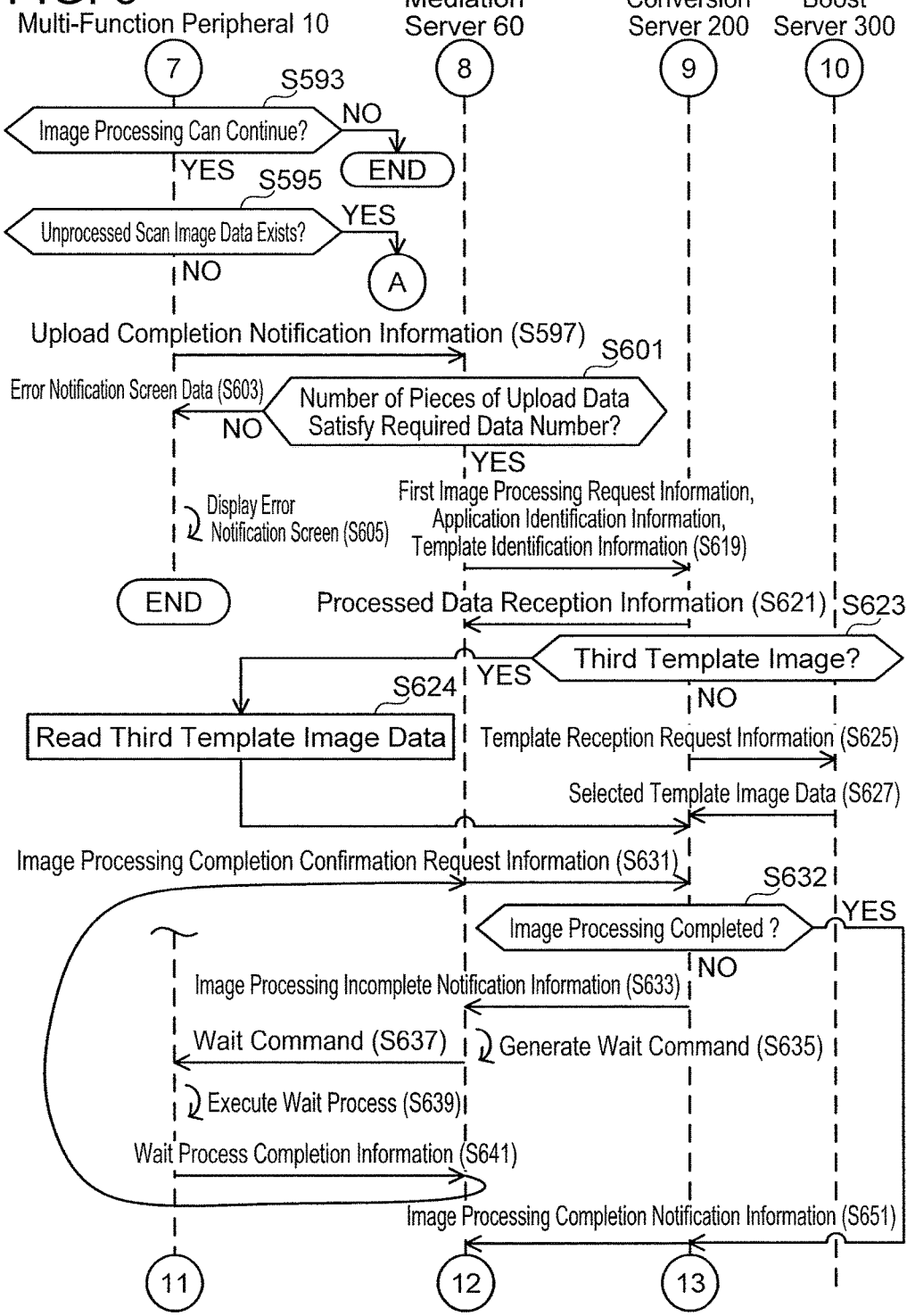
FIG. 5 shows a sequence diagram of various processing executed by each device.

As shown in FIG. 1, a communication system 2 includes a multi-function peripheral 10, a mediation server 60, a contents server 100, a conversion server 200, and a boost server 300. The multi-function peripheral 10 is connected with the Internet 6 via a LAN 4. The mediation server 60, the contents server 100, the conversion server 200, and the boost server 300 are connected with the Internet 6. Various types of information are communicated between these devices using a system that is compliant with the IP protocol. The term "communicate between/with" herein may mean "electrically connect between/with".

The multi-function peripheral 10, the mediation server 60, the conversion server 200, and the boost server 300 perform communication by, e.g., HTTP (referred to as HyperText Transfer Protocol) or HTTPS (referred to as HyperText Transfer Protocol Secure). More specifically, the multi-function peripheral 10 operates as a HTTP client. The conversion server 200 operates as a HTTP server. On the other hand, the mediation server 60 operates as a HTTP server in communication with the multi-function peripheral 10, and operates as a HTTP client in communication with the conversion server 200, thereby being capable of executing communication with the multi-function peripheral 10 and communication with the conversion server 200 without being obstructed by a firewall or the like provided in the LAN 4, etc.

The multi-function peripheral 10 and the boost server 300 are disposed in a first region A1. The mediation server 60 and the conversion server 200 are installed in a second region A2 that differs from the first region A1. The contents server 100 is illustrated in the drawing as being a single server, but is divided into a plurality of servers respectively installed in the first region A1 and the second region A2. In an illustrative example of the present embodiment, a case in which the first region A1 is Japan, and the second region A2 is a region other than Japan will mainly be explained. Of course, a multi-function peripheral 10 that has been sold in Europe can be installed in any of the countries of Europe. In this case, Europe is the first region A1. Further, a multi-function peripheral 10 that has been sold in China is installed in China. In this case, China is the first region A1. A mediation server 60 and a conversion server 200 that are installed in the second region A2 are configured so as to communicate with a multi-function peripheral 10 that is installed in Japan, a multi-function peripheral 10 that is installed in Europe, and a multi-function peripheral 10 that is installed in China. One example of the second region A2 is the United States (referred to as US). Furthermore, a multi-function peripheral 10 installed in the US can also communicate with the mediation server 60 and the conversion server 200. Thus, the multi-function peripherals 10 installed in Japan, Europe, China, and the US are able to use both the mediation server 60 and the conversion server 200. That is, when a multi-function peripheral 10 that is using the mediation server 60 is regarded as a point of reference, the first region A1 can be understood to be the region where the relevant multi-function peripheral 10 is installed. The conversion server 200 and the boost server 300 are connected via a virtual internal network. A virtual private network (referred to as VPN) can be cited as an example of a virtual internal network.

(Structure of Multi-Function Peripheral 10)

The multi-function peripheral 10 may execute a Printing function, a Scan function, a Copy function, a FAX function, or the like. The multi-function peripheral 10 comprises an operating unit 12, a display unit 14, a network interface (described as "I/F," hereinafter) 16, a print executing unit 18, a scan executing unit 19, and a controller 20. The operating unit 12 has a plurality of keys. A user can input various instructions to the multi-function peripheral 10 by operating the operating unit 12. The display unit 14 is a display for displaying various pieces of information. The network I/F 16 is connected to the LAN 4. The multi-function peripheral 10 is capable of communicating with the mediation server 60, the conversion server 200, etc. via the network I/F 16. The print executing unit 18 comprises an inkjet or laser printing mechanism. The scan executing unit 19 comprises a scan mechanism such as a CCD or CIS. The controller 20 comprises a CPU 22 and a memory 24. The CPU 22 executes various processes in accordance with program 25 stored in the memory 24. The memory 24 may be a computer readable storage medium. The computer readable storage medium is a non-transitory medium, such as a ROM, RAM, flash memory, hard disk, etc. An electrical signal carrying a program to be downloaded from a server, etc. on the Internet is not included in the non-transitory medium.

(Structure of Mediation Server 60)

The mediation server 60 is a server independent of the conversion server 200 and the contents server 100. The mediation server 60 is a server for mediating communication of various data between the conversion server 200 and the multi-function peripheral 10. The mediation server 60 is a server provided by a vendor or a manufacturer of the multi-function peripheral 10. The mediation server 60 is a server that is capable of communicating with multi-function peripherals 10 installed in various regions. That is, the mediation server 60 is a server that is also capable of communicating with a multi-function peripheral 10 that is installed in a region other than the region in which the mediation server 60 is installed. The mediation server 60 includes a network I/F 62 and a controller 70. The mediation server 60 is capable of communicating with the multi-function peripheral 10, the contents server 100, the conversion server 200, etc. via the network I/F 62. The controller 70 comprises a CPU 72 and a memory 74. A program 75 is stored in the memory 74. The CPU 72 executes various processes in accordance with the program 75. As with the memory 24, the memory 74 may be a computer readable storage medium.

(Structure of the Conversion Server 200)

The conversion server 200 is a server configured as a separate entity from the mediation server 60 and the contents server 100. The conversion server 200 executes image processing, described below, of data of various types. The conversion server 200 may be a server which is provided to a vendor of the multi-function peripheral 10. The conversion server 200 may be a server that is capable of communicating with multi-function peripherals 10 installed in various regions. That is, the conversion server 200 may be a server that is also capable of communicating with a multi-function peripheral 10 that is installed in a region other than the region in which the conversion server 200 is installed. The conversion server 200 comprises a network interface 262 and a controller 270. The controller 270 comprises a CPU 272 and memory 274. A program 275 and a template storage area 276 are stored in the memory 274. The CPU 272 executes various processes in accordance with the program 275. Third template image data 123 is stored in the template storage area 276. The third template image data 123 is data for displaying each of a plurality of third template images, to be described. As with the memory 24, the memory 274 may be a computer readable storage medium.

The program 275 includes an A application 281, a B application 282, a C application 283, and a D application 284 as programs for executing image processing. The A application 281 to the C application 283 are applications for executing processing that synthesizes image data, which was received by the user using a scan process, with other image data prepared beforehand. The D application 284 is an application for processing text included in an image represented by the user-received image data.

Figure 12:
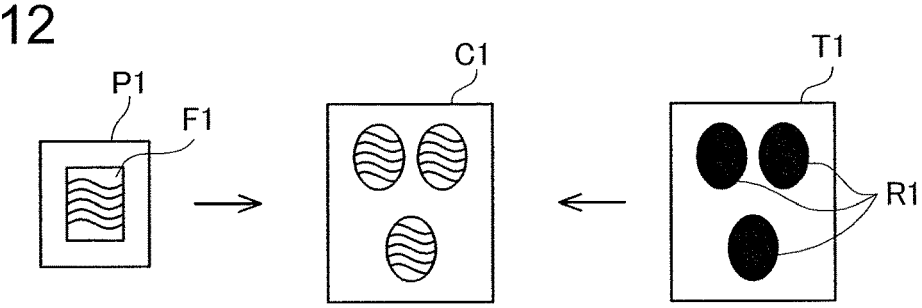
FIG. 12 shows an example of various processing executed by an A application.

The A application 281 is an application for executing image processing for synthesizing an output image P1, which is represented by output image data outputted from the multi-function peripheral 10, with an A application first template image T1, which is represented by first template image data outputted from the contents server 100. Specifically, as shown in FIG. 12, the A application 281 generates synthesized image data representing a synthesized image C1 by extracting image data representing a feature part F1 within the output image from the output image data representing the output image P1, and performing image processing on the extracted image data and the first template image data representing the first template image T1. The synthesized image C1 is an image in which the feature part F1 of the output image P1 has been synthesized with a specific field R1 (Ex: a transmission field) included in the first template image T1. Further, the synthesized image C1 is an image the size of a postcard. Moreover, the A application 281 executes image processing using the first template image data that has been designated by the user of the multi-function peripheral 10 from among a plurality of pieces of first template image data stored in the contents server 100. The number of output images required in the image processing performed by the A application 281 is one. That is, one piece of output image data is required. Further, the A application 281 is able to use, as output image data, both image data that has been obtained by the multi-function peripheral 10 scanning a document, and image data stored on a media mounted in the multi-function peripheral 10. Information indicating which image data is capable of being used as output image data by applications A to D is stored in the memory 74 of the mediation server 60.

Figure 13:
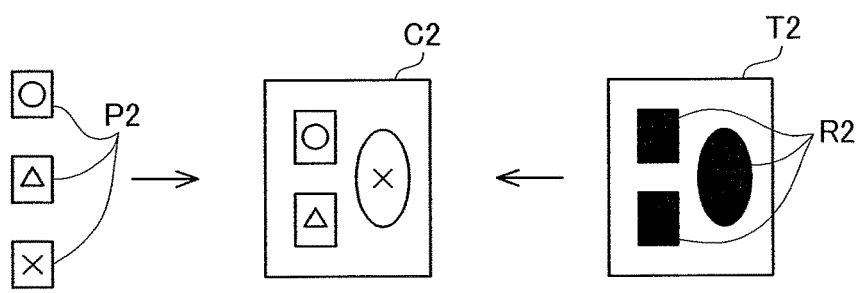
FIG. 13 shows an example of various processing executed by a B application.

The B application 282 is an application for executing image processing for synthesizing an output image, which is represented by output image data outputted from the multi-function peripheral 10, with a B application second template image, which is represented by second template image data outputted from the contents server 100. Specifically, as shown in FIG. 13, the B application 282 generates synthesized image data representing a synthesized image C2 by performing image processing on output image data representing an output image P2 and the second template image data representing the second template image T2. The synthesized image C2 is an image that has been synthesized so that the output images P2 are respectively inserted into each of one or more specific fields R2 (Ex: image insertion field) included in the second template image T2. Furthermore, the B application 282 executes image processing using second template image data that has been designated by the user of the multi-function peripheral 10 from among a plurality of pieces of second template image data stored in the contents server 100. The number of output images required in the image processing performed by the B application 282 coincides with the number of specific fields. Further, a specific date and a specific region are associated with the B application 282 beforehand. The specific date and the specific region are information used in a first selection process of S282, which will be explained later. Further, the A application 281, the C application 283, and the D application 284 are not associated with a specific date and a specific region. Information indicating which application is associated with which specific date may be stored in the mediation server 60. An application for creating New Year's cards can be cited as a specific example of the B application 282. Further, in an illustrative example of the present embodiment, a case in which the specific date is "November to the following January" will be explained. Also, a case in which the specific region is "Japan" will be explained. Moreover, the B application 282 can use as output image data only image data stored on a media mounted in the multi-function peripheral 10.

Figure 14:
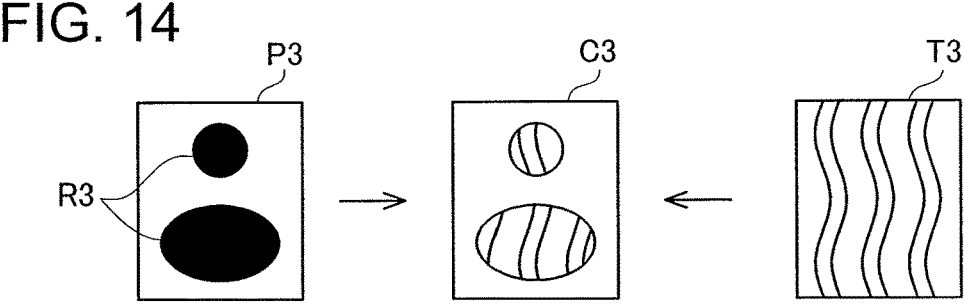
FIG. 14 shows an example of various processing executed by a C application.

The C application 283 is an application for executing image processing for synthesizing an output image, which is represented by output image data outputted from the multi-function peripheral 10, with a C application third template image T3, which is represented by third template image data outputted from the contents server 100. Specifically, as shown in FIG. 14, the C application 283 generates synthesized image data representing a synthesized image C3 by performing image processing on output image data representing an output image P3 and the third template image data representing the third template image T3. The synthesized image C3 is an image that is synthesized so that the third template image is inserted into a specific field R3 (Ex: the blackened field) of the output image P3 outputted from the multi-function peripheral 10. Furthermore, the C application 283 executes image processing using third template image data that has been designated by the user of the multi-function peripheral 10 from among a plurality of pieces of third template image data stored in the contents server 100. The third template image may be a pattern image comprising a fixed pattern. A wavy line pattern having a plurality of wavy lines in succession, or a check pattern having a succession of check patterns are examples of pattern images. The number of output images required in the image processing performed by the C application 283 is one. Further, the C application 283 can use as output image data only image data that has been obtained by the multi-function peripheral 10 scanning a document.

Figure 15:
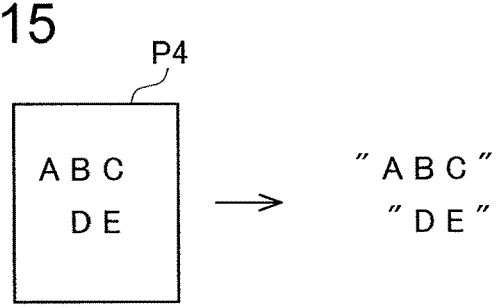
FIG. 15 shows an example of various processing executed by a D application.

An example of the processing of the D application 284 is shown in FIG. 15. The D application 284 may be an application for executing image processing that changes a text portion into text data by performing optical character recognition (referred to as OCR) on a text portion included in an output image P4 represented by output image data outputted from the multi-function peripheral 10. Further, the D application 284 can use as output image data only image data that has been obtained by the multi-function peripheral 10 scanning a document.

Further, the D application 284 may also be an application for executing image processing for generating postcard image data for printing a postcard on which a sender's name and a sender's address are arranged on a first side, and an addressee's name and an addressee's address are arranged on a second side, by extracting output image data respectively representing the sender's name and the sender's address, and the addressee's name and the addressee's address included in the output image P4 represented by the output image data outputted from the multi-function peripheral 10, and performing image processing on the extracted image data. Programs for realizing the respective applications are configured by combining a program that is unique to each application with a program shared in common by the respective applications. Thus, the program for realizing the B application is also stored in the conversion server 200 together with the programs for realizing the other applications.

(Structure of Contents Server 100)

The contents server 100 is a server independent of the mediation server 60 and the conversion server 200. The contents server 100 may be a server provided by the vendor of the multi-function peripheral 10. The contents server 100 comprises a memory 101. A template storage area 102 is stored in the memory 101. First template image data 121 and second template image data 122 are stored in the template storage area 102. The first template image data 121 and the second template image data 122 are used in an image processing executed by the conversion server 200. The first template image data 121 is data for displaying the first template image described above. The second template image data 122 is data for displaying the second template image described above.

The first template image data 121 and the second template image data 122 are stored in the template storage area 102 of the contents server 100. On the other hand, the third template image data 123 is stored in the memory 274 of the conversion server 200. The reason for this is as follows.

When executing an editing operation or maintenance on a template image stored in the conversion server 200, the image processing executed by the conversion server 200 may be affected. As described above, the third template image data 123 may be a pattern image. Consequently, the frequency of executing the editing operation, etc. for the third template image data 123 can be reduced compared to the first template image data 121 and the second template image data 122. Hence, the third template image data 123 can be stored in the memory 274 of the conversion server 200. Further, by storing the first template image data 121 and the second template image data 122 in the contents server 100, it is possible to prevent the first template image data 121 and the second template image data 122, which undergo the editing operation, etc. at a high frequency, from being affected by the image processing executed by the mediation server 60 or the conversion server 200.

When the A application 281 and the B application 282 are executed, template image data designated by the user of the multi-function peripheral 10 must be obtained from the contents server 100 in S625, to be described. On the other hand, when the C application 283 is executed, it is not necessary to obtain template image data designated by the user of the multi-function peripheral 10 from the contents server 100, since the template image data designated by the user may be read from the memory 274 in S624, to be described.

Furthermore, button image data representing a button image displayed on the multi-function peripheral 10 is also stored in the memory 101. From among the button image data, button image data corresponding to an application to which a specific region has been associated is stored in the memory 101 of the contents server 100 installed in the relevant specific region. Button image data corresponding to template image data and an application to which a specific region has not been associated is stored in the memory 101 of the contents server 100 installed in the second region A2.

A proxy server not shown in the drawings is installed in the first region, and the multi-function peripheral 10 installed in the first region may be configured so as to communicate with the contents server 100 installed in the second region via the proxy server. In this case, the button image data or template image data sent from the contents server 100 is stored temporarily in the proxy server, and is sent from the proxy server to the multi-function peripheral 10. Subsequently, when the multi-function peripheral 10 installed in the first region attempts to receive either the button image data or the template image data from the contents server 10 installed in the second region, the multi-function peripheral 10 and the contents server 100 need not communicate. The multi-function peripheral 10 is able to receive either the button image data or the template image data temporarily stored in the proxy server by communicating only with the proxy server. That is, using the proxy server makes it possible to shorten the communication time of the multi-function peripheral 10 for receiving either the button image data or the template image data.

(Structure of Boost Server 300)

The boost server 300 is a server that is configured as a separate entity from the conversion server 200 and the contents server 100. The boost server 300 is a server for mediating the communications of various types of data between the conversion server 200 and the multi-function peripheral 10. The boost server 300 may be a server that is provided by the multi-function peripheral 10 vendor. The boost server 300 may be a server that is installed in a region that differs from that of the conversion server 200 and the contents server 100. The boost server 300 is a server that communicates at high speed with the conversion server 200. The boost server 300 comprises a network interface 362 and a controller 370. The boost server 300 is able to communicate with the multi-function peripheral 10, the conversion server 200, and so forth via the network interface 362. The controller 370 comprises a CPU 372 and a memory 374. A program 375 is stored in the memory 374. The CPU 372 executes various processing in accordance with the program 375. The memory 374 may be a computer-readable storage medium the same as the memory 24.

(Communication Content of Communication System)

Processing for uploading data from the multi-function peripheral 10 to the conversion server 200 includes a boost upload process and a normal upload process. The boost upload process is a process in which the multi-function peripheral 10 sends data to the conversion server 200 via the boost server 300. The normal upload process is a process in which the multi-function peripheral 10 sends data to the conversion server 200 without going through the boost server 300. In the normal upload process, communications are performed from the multi-function peripheral 10 installed in the first region A1 to the conversion server 200 installed in the second region A2 using an ordinary Internet connection. On the other hand, in the boost upload process, communications are performed using an ordinary Internet connection only from the multi-function peripheral 10 installed in the first region A1 to the boost server 300 in the first region A1. Then, communications are performed using a VPN from the boost server 300 installed in the first region A1 to the conversion server 200 installed in the second region A2. Since the communication distance of communications within the first region A1 is shorter than that of the communications between the first region A1 and the second region A2, communication time is shortened. Further, since communications go through routing devices such as a router and/or a gateway not shown in the drawing fewer numbers of times, there are also fewer time delays caused by routing. Thus, the time required for the multi-function peripheral 10 to send data is shorter for the boost upload process than when the same data is sent using the normal upload process. Further, the execution communication speed of the VPN is faster than that of the ordinary Internet connection. Thus, the time required by the multi-function peripheral 10 from upload start to upload end is shorter overall for the boost upload process than when the same data is sent using the normal upload process.

Further, processing for downloading data from the conversion server 200 to the multi-function peripheral 10 includes boost download processing and normal download processing. The boost download processing is processing in which the conversion server 200 sends data to the multi-function peripheral 10 via the boost server 300. The normal download processing is processing in which the conversion server 200 sends data to the multi-function peripheral 10 without going through the boost server 300. The time required for the multi-function peripheral 10 to receive data is shorter at boost download processing than when the same data is sent using normal download processing. Further, the time required by the multi-function peripheral 10 from download start to download end is shorter overall for boost download process than when the same data is sent using the normal download process. The reasons for this are the aforementioned communication distances, number of times routing is performed, and execution communication speeds.

(Some Features Relating to the Description)

Some features relating to the description in the present specification are hereby explained. In the present specification, the description "the CPU 72 of the mediation server 60 receives various information" includes the technical meaning "the CPU 72 of the mediation server 60 receives various information via the network interface 62". Further, the description "the CPU 72 of the mediation server 60 sends various information" includes the technical meaning "the CPU 72 of the mediation server 60 outputs various information via the network interface 62". Similar features exist regarding the CPU 272 and the network interface 262 of the conversion server 200, and the CPU 372 and the network interface 362 of the boost server 300. Similar features exist regarding the CPU 22 of the multi-function peripheral 10 and the network interface 16.

The programs stored in the memory 74 are executed by the CPU 72. However, in the present specification, the operations of the respective programs may be explained omitting the CPU 72. That is, in the following explanation, a statement to the effect that "Program A executes processing A" may indicate that "The CPU 72 executes processing A described in program A". The same holds true for a multi-function peripheral 10 program, a conversion server 200 program, and a boost server program 300.

Further, the programs stored in the memory 74 make a determination about an event and operates in accordance with the result of the determination. However, in the present specification, the operation of the respective programs may be explained omitting the making of determinations. That is, in the following explanation, a statement to the effect that "The control program executes processing A in accordance with condition A" may indicate that "The control program determines whether or not there is a condition A. The control program executes processing A in accordance with an affirmative determination". The same hold true for a multi-function peripheral 10 program, a conversion server 200 program, and a boost server 300 program.

Further, the programs stored in the memory 74 specify, receive, extract, determine, recognize, or select data and so forth. The specification of data and so forth by a program, for example, indicates processing that specifies data that matches a condition from among a plurality of data and so forth, and stores the relevant data itself, or information identifying the relevant data in a predetermined storage area. The information for identifying the data and so forth, for example, is identification information that identifies the relevant data and so forth, an array index in which the relevant data and so forth is stored, or a pointer that points to the storage area where the relevant data and so forth is stored. The same holds true for processing in which the program receives, extracts, determines or selects the data and so forth. The same holds true for a multi-function peripheral 10 program, a conversion server 200 program, and a boost server 300 program.

The programs stored in the memory 74 control the respective hardware of the mediation server 60 by invoking an application programming interface (referred to as API) provided by the mediation server 60 operating system (referred to as OS). However, in the present specification, the operations of the respective programs may be explained omitting the OS. That is, in the following explanation, a statement to the effect that "Program B controls hardware C" may indicate that "Program B controls hardware C through the API of the OS". The same holds true for a multi-function peripheral 10 program, a conversion server 200 program, and a boost server 300 program.

Furthermore, the "data" and the "information" in the present specification are compatible in that they are the bits and/or the bit strings capable of being handled by a computer. "Data" indicates bits that can be handled without the computer taking into account the semantic content represented by each bit. In contrast, "information" indicates bits that cause the operation of the computer to branch in accordance with the semantic content of the bits. In addition, an "instruction" is a control signal for prompting the next operation of the destination device, and may include information, and the instruction itself may be characterized as information. Further, even though the format (e.g., text format, binary format, flag format, and so forth) changes for each computer, the "data" and the "information" are handled as the same data and information as long as the same semantic content is recognized. For example, information denoting "two" may be held in a certain computer in ASCII code as the text-formatted information "0x32", and may be held in a different computer in binary notation as the binary-formatted information "10".

However, the distinction between the aforementioned "data" and "information" is not rigid, and exceptional treatment is also allowed. For example, data may be temporarily treated as information, and information may be temporarily treated as data. Further, bits treated as data in a certain device may be treated as information in another device. In addition, information may be fetched from inside data, and data may be fetched from inside information.

In the present specification, a case is explained in which the mediation server 60, conversion server 200 and contents server 100 are connected by the Internet 6 (that is, when a device functioning as the mediation server 60, a device functioning as the conversion server 200 and a device functioning as the contents server 100 are disposed at physically distant positions), but other configurations are possible. The mediation server 60, conversion server 200 and contents server 100 may be realized as a single server. In this case, in the single server, a program which functions as the mediation server 60 and a program which functions as the conversion server 200 run, and communication between the programs is performed via a bus in the server. When the mediation server 60 and conversion server 200 are realized as a single server, in the present specification, communication which is explained as communication between the mediation server 60 and the conversion server 200 may be taken to mean communication between the program which functions as the mediation server 60 and the program which functions as the conversion server 200. Further, a configuration may be realized in which a program which functions as the mediation server 60, and moreover also functions as the conversion server 200, runs on a single server. In this case, in the present specification, communication which is explained as communication between the mediation server 60 and the conversion server 200 may replaced with passing of data within the program which functions as the mediation server 60 and which moreover functions as the conversion server 200.

(Operation of Communication System (Part 1))

Figure 6:
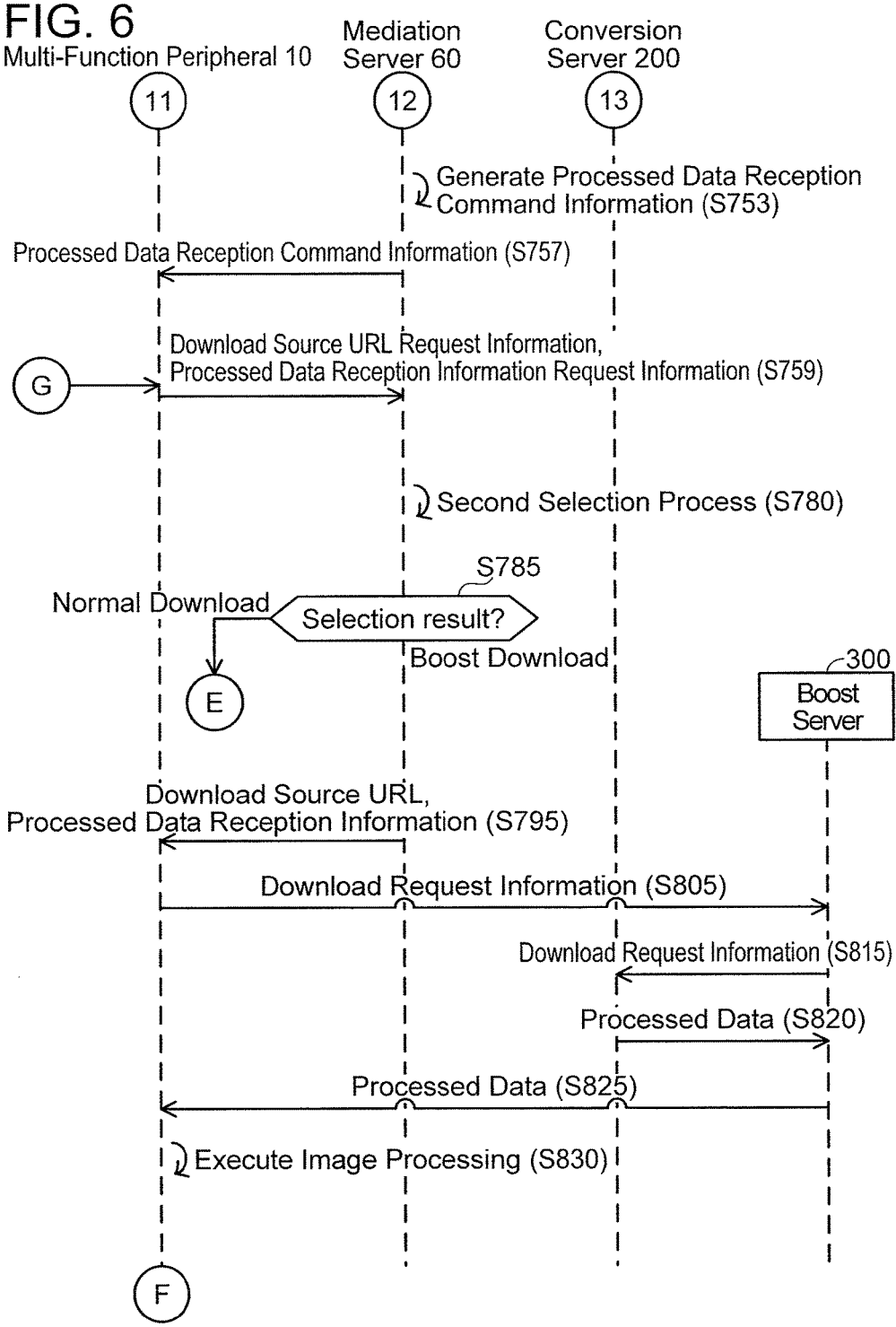
FIG. 6 shows a sequence diagram of various processing executed by each device.
Figure 7:
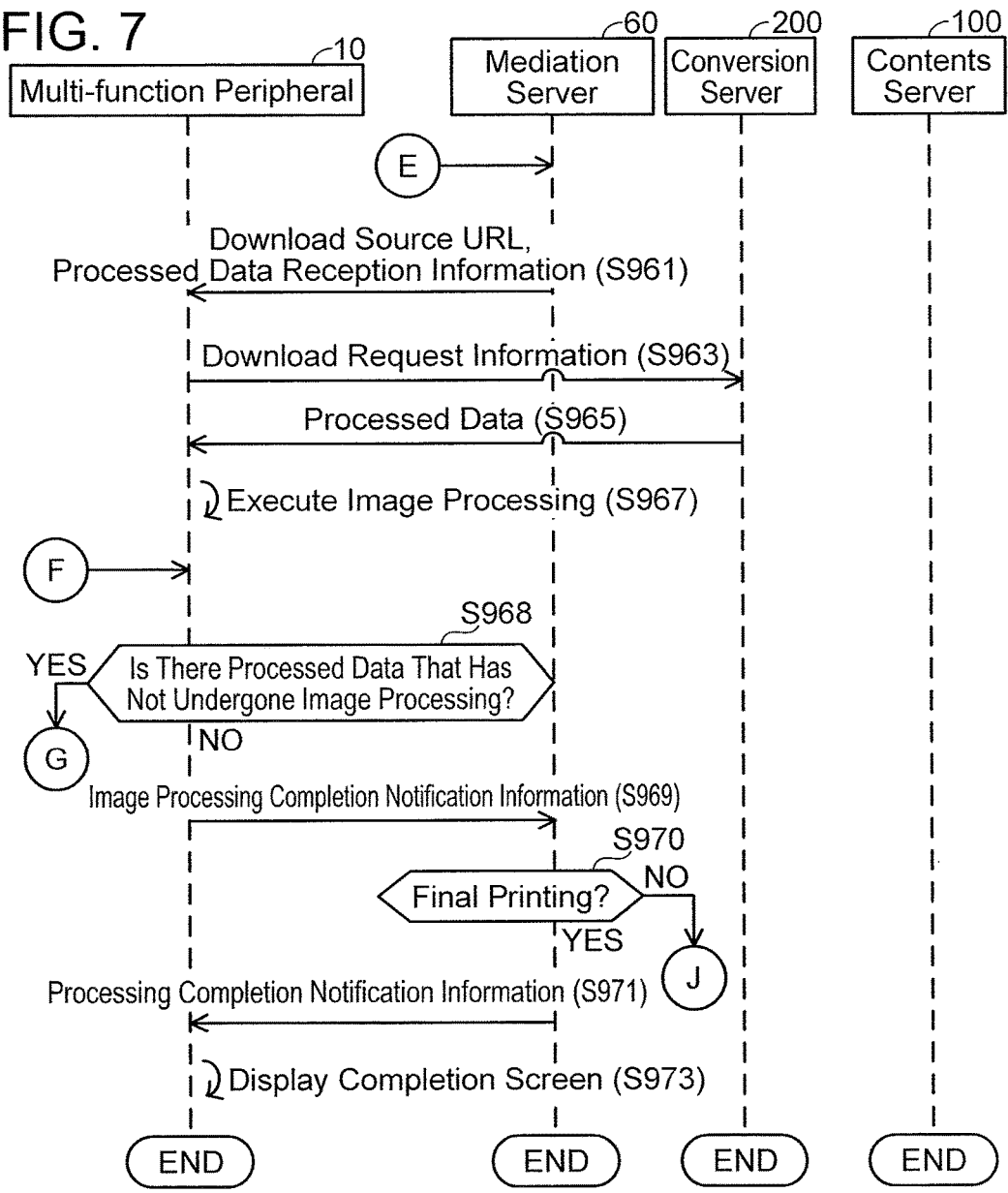
FIG. 7 shows a sequence diagram of various processing executed by each device.

Operation of the communication system 2 will be described using sequence diagrams of FIGS. 2 to 5. In receiving a command for displaying a main screen, the CPU 22 of the multi-function peripheral 10 cause the display unit 14 to display the main screen in S210. The command for displaying the main screen may be input from the operating unit 12 by a user. Data for displaying the main screen may be preliminarily stored in the memory 24. An example of the main screen 201 is shown in FIG. 6. The main screen 201 includes button images B1 and B2. The button images B1 and B2 are images for receiving an input of an execution instruction among a plurality of functions. A function received by the button image B1 is an application function. The application function is a function by which the multi-function peripheral 10 utilizes the A application 281 to the D application 284 via the mediation server. A function received by the button image B2 is a menu function.

The menu function is a function that performs processing for executing various settings of the multi-function peripheral 10.

When an operation of selecting the button image B1 or B2 is executed in the multi-function peripheral 10, in S212 the CPU 22 sends function identification information and supplementary information to the mediation server 60. The function identification information is information indicating a function associated with the selected button image. One example of the function identification information may be numeric character corresponding to the button image B1. Another example of the function identification information may be "application function", which is the name of the button image B1. That is, the function identification information may be information indicating the selected button.

The supplementary information is information that includes various types of information related to the multi-function peripheral 10. The supplementary information includes forwarding information, a global IP address, date/time information, and model information. The forwarding information is information for identifying the region in which the multi-function peripheral 10 is installed. The forwarding information is information that indicates the shipment region of the multi-function peripheral 10. "Region" here includes various types of concepts. The "region" may be a "country", may be a limited area inside a country (e.g.: a province), or may be collection of a plurality of countries (e.g.: Asia). The global IP address is information that conforms to the IP protocol. The multi-function peripheral 10 communicates with the mediation server 60 via a not-shown router that is located between the Internet 6 and the multi-function peripheral 10. Thus, when the multi-function peripheral 10 sends data to the mediation server 60, a global IP address that has been allocated to the router is included as the source address of the IP packet used to send the data. The relevant global IP address is the global IP address included in the supplementary information. A prescribed range of global IP addresses is allocated to each region. For example, a range of global IP addresses from 10.0.0.0 to 14.255.255.255 is allocated to a region A, and a range of global IP addresses from 15.0.0.0 to 19.255.255.255 is allocated to a region B. That is, the range of global IP addresses from 10.0.0.0 to 14.255.255.255 is set in the router installed in region A. The date/time information is information for identifying a send time at which the function identification information and/or application identification information, which will be explained later, was sent. The send time here is the local time in the region where the multi-function peripheral 10 is installed. For example, when the multi-function peripheral 10 is installed in Japan, the send time is Japan standard time. The model information is information indicating the model number of the multi-function peripheral 10. The date/time information may be added by the multi-function peripheral 10 when the multi-function peripheral 10 sends data to the mediation server 60, or may be added by the router when the router sends the data to the mediation server 60.

When receiving the function identification information from the multi-function peripheral 10, in S214 the CPU 72 of the mediation server 60 determines the function to which the function identification information corresponds. When the CPU 72 determines that the function identification information corresponds to the menu function (S214: menu function), a menu function execution process is executed. Processing contents of the menu function execution process will be omitted. On the other hand, when the CPU 72 determines that the function identification information corresponds to the application function (S214: application function), the process proceeds to S218.

In S218, as the image data to be sent next to the multi-function peripheral 10, the CPU 72 specifies application selection screen data for displaying the application selection screen 211 on the multi-function peripheral 10. The application selection screen 211 is a screen for receiving the selection of any application from among the plurality of application functions. Correspondence information (not shown), which shows the correspondence between information capable of being received from the multi-function peripheral 10 and image data, is stored in the memory 74. The CPU 72 refers to the relevant correspondence information to specify the image data that corresponds to the information received from the multi-function peripheral 10.

In S218, the CPU 72 of the mediation server 60 generates the application selection screen data for causing the application selection screen 211 to be displayed. Information (not shown) indicating which type of information should be included in the application selection screen data is stored in the memory 74. The CPU 72 of the mediation server 60 generates the application selection screen data according to this information.

Further, on the basis of the received supplementary information, the CPU 72 selects a button image to be displayed on the application selection screen 211. Specifically, the CPU 72 recognizes the region indicated by the forwarding information included in the supplementary information (S221). Further, the CPU 72 may read the global IP address included in the supplementary information (S221). Then, the CPU 72 may recognize the region to which the read global IP address has been allocated. Then, as the button images to be displayed, the CPU 72 selects a button image corresponding to an application that is not associated with a specific region, and a button image corresponding to an application that coincides with the recognized region. Specifically, when the recognized region is "Japan", the CPU 72 selects the button images B11 to B14 corresponding to the A application 281 to the D application 284 as the button images to be displayed. Further, when the recognized region is a region that differs from "Japan", the CPU 72 selects the button images B11, B13 and B14 as the button images to be displayed, but does not select the button image B12 as a button image to be displayed. Included in the application selection screen data is information indicating that the button images B11 to B14 are included on the application selection screen 211, information indicating that a screen for selecting any of the image buttons B11 to B14 is displayed, application identification information for identifying the A application 281 to the D application 284, information showing a character string for display accompanying the button images B11 to B14, and information for receiving from the contents server 100 button image data representing the button images B11 to B14. The application identification information is associated with each of the button images B11 to B14. Numerals corresponding to the button images B11 to B14, and application names corresponding to the button images B11 to B14 may be cited as examples of the application identification information. Information for receiving the button image data from the contents server 100 may be in URL format. Furthermore, the button image data representing the button image B12 corresponding to the B application 282 to which the specific region "Japan" is associated is stored in the contents server 100 installed in "Japan", and the other button images B11, B13 and B14 are stored in the contents server 100 installed in the second region A2. In S219, the CPU 72 of the mediation server 60 sends the application selection screen data to the multi-function peripheral 10.

Figure 10:
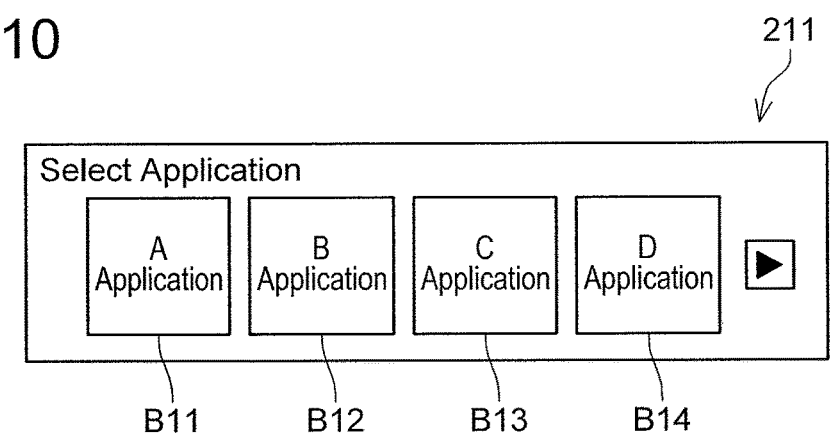
FIG. 10 shows an example of an application selection screen display.

In receiving the application selection screen data from the mediation server 60, in S220 the CPU 22 of the multi-function peripheral 10 causes the application selection screen 211 to be displayed on the display unit 14. As shown in FIG. 10, the application selection screen 211 includes the button images B11 to B14. Each of the button images B11 to B14 is an image for receiving selection of the application functions of each of the A to D applications.

The CPU 22 uses the information for receiving the button image data from the contents server 100 to receive the button image data from the contents server 100 and causes the application selection screen 211 to be displayed on the display unit 14. Consequently, the button image data for displaying the images of the button images B11 to B14 does not need to be included in the application selection screen data. Moreover, the button image data may be bitmap information in a bitmap format. The user operates the operating unit 12 to select the button image representing the desired application from the application selection screen 211.

When the operation of selecting the button image in the multi-function peripheral 10 is performed, in S221 the CPU 22 of the multi-function peripheral 10 sends application identification information and the supplementary information to the mediation server 60.

In S222, the CPU 72 of the mediation server 60 determines whether or not to cause the scan/media selection screen to be displayed based on the application identification information received from the multi-function peripheral 10. Specifically, a determination to cause the scan/media selection screen to be displayed is made when the selected application indicated by the application identification information is an application for which both image data obtained by the multi-function peripheral 10 scanning a document, and image data stored on a media mounted in the multi-function peripheral 10 can be used as the output image data. On the other hand, a determination not to cause the scan/media selection screen to be displayed is made when the selected application is an application for which either the image data obtained by the multi-function peripheral 10 scanning a document or the image data stored on a media mounted in the multi-function peripheral 10 alone can be used as the output image data. When a determination has been made to cause the scan/media selection screen to be displayed, the CPU 72 generates the scan/media selection screen data for causing the scan/media selection screen to be displayed. The scan/media selection screen is a screen for receiving an input as to whether the data generated by the scan process or the data stored on the media is to be used as the data to be uploaded to the conversion server 200. The media may be the memory 24. The media may be a storage media that is capable of being connected to the multi-function peripheral 10. The media is capable of storing various types of formatted data. A memory card (not shown) can be cited as an example of a media.

In S223, the CPU 72 of the mediation server 60 sends the scan/media selection screen data to the multi-function peripheral 10. The CPU 22 of the multi-function peripheral 10, when receiving the scan/media selection screen data from the mediation server 60, in S224, causes the scan/media selection screen to be displayed on the display unit 14. The scan/media selection screen, for example, includes a scan button image, which is the button image corresponding to a scan, and a media button image, which is the button image corresponding to the media.

In S225, the CPU 22 receives the selection of either one of the scan or the media. For example, the selection may be received by the user operating the operating unit 12 and selecting the button image representing the processing to be executed from the scan/media selection screen.

The operation when the media is selected in S225 (S225: Media) will be explained. In this case, the process for uploading the media image data is executed. Then the processing proceeds to S282. The media image data upload process is a process for uploading to the conversion server 200 the media image data stored in the media of the multi-function peripheral 10. The specific processing contents of the media image data upload process are not shown in the drawings. The media image data upload process is a process that differs in part from the scan image data upload process, which will be explained later. Of the processing from S226 to S276, in S226, the CPU 22 may send to the mediation server 60 media identification information indicating that the media has been selected. Further, in S226 to S276, the "media image data" may be processed in place of the "scan image data". Further, in S265, the CPU 22 may execute processing that allows the user to select the image data to be uploaded from among a plurality of image data stored on the media and read the selected image data. This image data, which is selected by the user and read by the CPU 22, is the "media image data".

On the other hand, when the scan is selected in S225 (S225: Scan), the processing proceeds to S226. In S226, the CPU 22 of the multi-function peripheral 10 sends scan identification information indicating that the scan was selected to the mediation server 60.

In S227, the CPU 72 of the mediation server 60 determines whether or not template image data is required. Specifically, when the received application identification information indicates the A application 281 to the C application 283, the CPU 72 determines that the template image data is required. On the other hand, when the received application identification information indicates the D application 284, the CPU 72 determines that the template image data is not required. When a negative determination is made (S227: NO), the processing proceeds to S239, and when an affirmative determination is made (S227: YES), the processing proceeds to S228.

In S228, the CPU 72 recognizes the selected application, which is the application indicated by the received application identification information, and generates template identification information reception request information corresponding to the selected application. The template list information reception request information is information for making a request to the contents server 100 for a plurality of pieces of template identification information, which is information for identifying each of a plurality of template images corresponding to the selected application. For example, when the selected application is the A application 281, a request is made to the contents server 100 for a plurality of pieces of first template identification information, which identifies a plurality of first template images. Further, for example, when the selected application is the C application 283, a request is made to the contents server 100 for a plurality of pieces of third template identification information, which identifies a plurality of third template images. In S229, the CPU 72 sends the template identification information reception request information to the contents server 100. In S231, the CPU 72 receives the template identification information sent from the contents server 100. Moreover, since thumbnail reception information for receiving thumbnail image data, which is associated with a plurality of pieces of template identification information and represents thumbnail images of the template images, is also sent from the contents server 100, in S231, the CPU 72 also receives the relevant thumbnail reception information. The thumbnail reception information may be URL-format information. The thumbnail image data is stored in the same contents server 100 as the template image data.

In S233, the CPU 72 generates template selection screen data for causing a template selection screen 212 to be displayed. The template selection screen data is data for causing the template selection screen 212 to be displayed on the display unit 14. The template selection screen 212 is a screen for listing template images corresponding to the selected application, and for receiving selection of one template image. Hereafter, the template image selected by the user will be described as a selected template image. The template selection screen data includes the template identification information received in S231, and the thumbnail reception information corresponding to the template identification information. In S235, the CPU 72 sends the template selection screen data to the multi-function peripheral 10.

Figure 11:
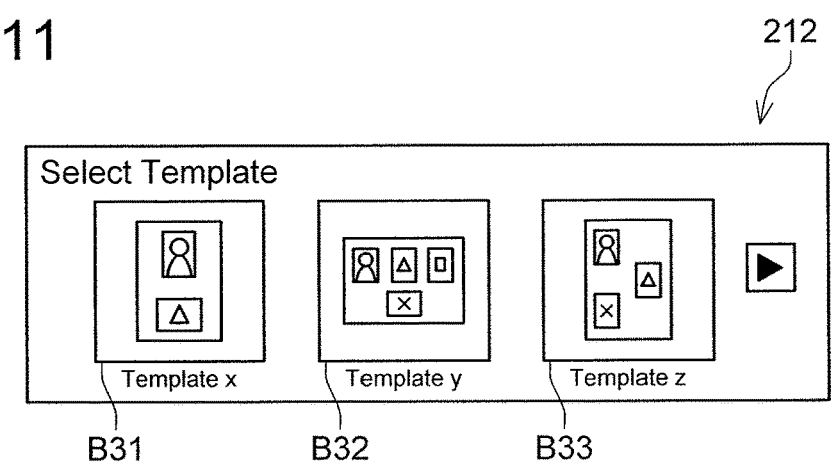
FIG. 11 shows an example of a template selection screen display.

When receiving the template selection screen data from the mediation server 60, in S236 the CPU 22 of the multi-function peripheral 10 causes the template selection screen 212 to be displayed on the display unit 14. FIG. 11 shows an example of the template selection screen 212. The template selection screen 212 includes thumbnail images B31 to B33. Each of the thumbnail images B31 to B33 is an image represented by the thumbnail image data received from the contents server 100 using the thumbnail reception information. The thumbnail images B31 to B33 are each an image for receiving selection of each of templates x to z. For example, when the selected application is the A application, the thumbnail images B31 to B33 are thumbnail images of the first template images used in the A application. Further, when the selected application is the B application, the thumbnail images B31 to B33 are thumbnail images of the second template images used in the B application. Moreover, when the selected application is the B application, the number of specific fields included in each of the plurality of second template images may be different. Consequently, the number of scan images required may be different according to which of the second template images is selected.

The user operates the operating unit 12 to select, from among the plurality of thumbnail images, a thumbnail image corresponding to the template image to be used. Thus, the selection of the selected template image is executed. In the present embodiment, the description will continue using as an example a case that the user selects the thumbnail image B31 (i.e., template x).

In S237, the CPU 22 sends template identification information for identifying the selected template image to the mediation server. In the illustrative example of the present embodiment, template identification information including a template name "template x" is sent image to the mediation server. That is, the template identification information may be information indicating the selected thumbnail image.

In S239, the CPU 72 of the mediation server 60 determines whether or not to execute a print preview display process. The print preview display process is a process for displaying on the display unit 14 a finished state of a printing when a print process has been executed by the multi-function peripheral 10 using processing data. The relevant determination may be made on the basis of the model information included in the supplementary information received in S221. That is, the CPU 72 may execute the print preview display process when the multi-function peripheral 10 model is a model that is provided with a display unit 14 having high enough performance to enable a preview display. The CPU 72 stores a print preview display flag showing the determination result in the memory 74.

In S242, the CPU 72 generates print processing selection screen data for causing a print processing selection screen to be displayed. The print processing selection screen data is data for causing the print processing selection screen to be displayed on the display unit 14. The print processing selection screen is a screen for receiving a selection as to which printing process, i.e., a trial printing process or a final printing process, is to be executed. The print processing selection screen includes a final print button image, which is a button image corresponding to the final printing process, and a trial print button image, which is a button image corresponding to the trial printing process. The trial printing process is print processing for confirming the printing mode. The final printing process is print processing for creating final printed matter. For example, the printing resolution of the trial printing process may be lower than that of the final printing process.

In S244, the CPU 72 sends the print processing selection screen data to the multi-function peripheral 10. The CPU 22 of the multi-function peripheral 10, when receiving the print processing selection screen data from the mediation server 60, in S246 causes the print processing selection screen to be displayed on the display unit 14. In S248, the CPU 22 sends print processing identification information for identifying the selected print processing to the mediation server 60.

In S251, the CPU 72 of the mediation server 60 sends data ID for image processing upload reception request information to the conversion server 200. The data ID for image processing upload reception request information is information for requesting, to the conversion server 200, "data ID for image processing upload" for identifying upload data which the multi-function peripheral 10 is now to upload to the conversion server 200. In S253, the CPU 272 of the conversion server 200 sends "the data ID for image processing upload" to the mediation server 60.

In S261, the CPU 72 of the mediation server 60 generates scan upload execution command information. The scan upload execution command information is information commanding the multi-function peripheral 10 to execute uploading to the conversion server 200 of upload data generated by a scan process. In S263, the CPU 72 sends the scan upload execution command information and required data number information to the multi-function peripheral 10. The required data number information is information indicating the number of pieces of scan image data required when the selected application is performed and image processing is executed by the conversion server 200. The required data number is a value determined by type of application and type of template. Specifically, when the selected application is the A or C application, the required data number is one. On the other hand, when the selected application is the B application, the required data number is a number of the specific fields included in the selected template image. That is, the CPU 72 determines the required data number on the basis of the selected template image identified using the template identification information received in S237, and sends the required data number information showing the determined required data number to the multi-function peripheral 10. In S264, the CPU 22 of the multi-function peripheral 10 causes the required data number to be displayed on the display unit 14. The display mode of the required data number may be in the manner of, e.g., "Please set 00 documents".

In S265, the CPU 22 of the multi-function peripheral 10 executes a scan of an image. Specifically, the user sets a paper, on which a prescribed image has been recorded, on the scan executing unit 19, and presses a start reading button of the operating unit 12, whereupon the CPU 22 uses the scan executing unit 19 to read the image recorded on the paper, and creates the upload data from the image data that was read.

In S271, the CPU 22 sends image processing upload destination URL reception request information, communication format reception request information, and information on Number of pieces to the mediation server 60. The information on Number of pieces is information for indicating a number of pieces of upload image data. The "image processing upload" is a process for uploading various data, for image processing, to the conversion server 200. The image processing upload destination URL reception request information is information for requesting an image processing upload destination URL, this being information needed for uploading to the conversion server 200. The communication format reception request information is information for requesting a communication format of an upload message (to be described). In the case of a scan image data upload process, the number of pieces of upload image data is the number of scanning surfaces read from the scanned document. In the case of a media image data upload process, the number of pieces of upload image data is the number of pieces of image data selected for uploading by the user. Furthermore, generally speaking, "media image data" and "scan image data" to be uploaded are also written as "upload data".

In S272, the CPU 72 of the mediation server 60 determines whether the number of pieces of data indicated by the information on Number of pieces received from the multi-function peripheral 10 is greater than the required data number. Specifically, when the selected application is the A or C application, it is determined whether the number of pieces of data indicated by the received information on Number of pieces is greater than one. Further, when the selected application is the B application, it is determined whether the number of pieces of data indicated by the received information on Number of pieces is greater than the required data number of the selected template images selected in S236. When a positive determination is made (S272: YES), the process proceeds to S274.

In S274, the CPU 72 sends error notification screen data to the multi-function peripheral 10. The error notification screen data is information for causing an error notification screen, this indicating that the number of pieces of scan image data does not comply with the required data number, to be displayed on the display unit 14. In S276, the CPU 22 of the multi-function peripheral 10 causes the error notification screen to be displayed on the display unit 14. For example, "Number of documents read is greater than required number" may be displayed on the error notification screen. Then the flow ends.

On the other hand, when a negative determination is made in S272 (S272: NO), the processing proceeds to S282. In S282, the CPU 72 executes a first selection process. The first selection process is a process for selecting which of the aforementioned upload processes, i.e., the boost upload process or the normal upload process, is to be used. The first selection process can take various processing modes. A first processing example to an eighth processing example are described below as specific examples of the first selection process. The CPU 72 may execute any one of these processing examples. Or the CPU 72 may execute a combination of a plurality of processing examples. When combining a plurality of processing examples, degrees of priority may be assigned to the processing examples. Then, when a conflicting selection occurs, the selection result of the processing example with the highest priority may be used.

The first processing example will be explained. The CPU 72 selects the normal upload process when the image processing performed by the selected application indicated by the application identification information received from the multi-function peripheral 10 in S221 is executed on the scan image data generated by the scan process (S265). On the other hand, the CPU 72 selects the boost upload process when the image processing performed by the selected application is executed on the media image data stored in the media. Specifically, the CPU 72 selects the normal upload process when the selected application can use as the output image data only image data obtained by the multi-function peripheral 10 scanning a document. When scan identification information has been received in S226, the CPU 72 selects the normal upload process. The CPU 72 selects the boost upload process when the selected application can use as the output image data only image data stored in the media mounted in the multi-function peripheral 10. The CPU 72 selects the boost upload process when media identification information has been received in S226.

The second processing example will be explained. The CPU 72 selects the boost upload process when the image processing performed by the selected application is processing for synthesizing output image data received from the multi-function peripheral 10 with template image data represented by the template identification information received from the multi-function peripheral 10 (S227: YES). Specifically, this is a case in which the selected application is any of the A application 281 to the C application 283. On the other hand, the CPU 72 selects the normal upload process when the image processing performed by the selected application is processing that differs from the processing for synthesizing output image data received from the multi-function peripheral 10 with template image data represented by the template identification information received from the multi-function peripheral 10 (S227: NO). Image processing for processing characters included in an image represented by image data received by the user can be cited as an example of this kind of processing. Specifically, when the selected application is the D application 284, the normal upload process is selected.

The third processing example will be explained. The CPU 72 recognizes the region indicated by the forwarding information included in the supplementary information received from the multi-function peripheral 10 in S221. Then, when the region indicated by the forwarding information is a predetermined specific region, the CPU 72 selects the boost upload process. On the other hand, when the region indicated by the forwarding information is a region other than the specific region, the CPU 72 selects the normal upload process. Furthermore, in an illustrative example of the present embodiment, a case in which the specific region is "Japan" will be explained.

The fourth processing example will be explained. The CPU 72 reads the global IP address included in the supplementary information received from the multi-function peripheral 10 in S221. Then, when the read global IP address is included in a range of global IP addresses allocated to the specific region, the CPU 72 selects the boost upload process. On the other hand, when the read global IP address is not included in the range of global IP addresses allocated to the specific region, the CPU 72 selects the normal upload process. That is, the CPU 72 can identify the region in which the multi-function peripheral 10, which is the source of the supplementary information, is installed by referring to the global IP address.

The fifth processing example will be explained. The CPU 72 reads the date/time information included in the supplementary information received from the multi-function peripheral 10 in S221. Then, when the read date/time information indicates a predetermined specific time point, the CPU 72 selects the boost upload process. On the other hand, when the read date/time information does not indicate a specific time point, the CPU 72 selects the normal upload process. A specific time slot in a day (e.g., business hours from 9 am to 6 pm) can be cited as an example of a specific time point. A specific period of time in a year (e.g., the New Year's card season from November to January of the next year) can be cited as another example of a specific time point.

The sixth processing example will be explained. The CPU 72 determines whether or not a predetermined specific region is associated with the selected application indicated by the application identification information received from the multi-function peripheral 10 in S221. When a specific region is not associated with the selected application, the CPU 72 selects the normal upload process. On the other hand, when a specific region is associated with the selected application, the CPU 72 reads the forwarding information included in the supplementary information received from the multi-function peripheral 10 in S221. Then, when the region indicated in the read forwarding information is included in the specific regions, the CPU 72 selects the boost upload process. On the other hand, when the region indicated in the read forwarding information is not included in the specific regions, the CPU 72 selects the normal upload process.

A specific example of the sixth processing example will be explained. When the selected application is an application other than the B application 282, the CPU 72 determines that a specific region is not associated with the selected application. Hence, the CPU 72 selects the normal upload process. On the other hand, when the selected application is the B application 282, the CPU 72 determines that a specific region is associated with the selected application. Then, when the region indicated by the forwarding information included in the supplementary information (e.g., Japan) is included in the specific region associated with the B application 282 (e.g., Japan), the CPU 72 selects the boost upload process. On the other hand, when the region indicate by the forwarding information is not included in the specific region associated with the B application 282, the CPU 72 selects the normal upload process.

The seventh processing example will be explained. The CPU 72 determines whether or not a predetermined specific date is associated with the selected application indicated by the application identification information. When a specific date is associated with the selected application, the CPU 72 reads the date/time information included in the supplementary information received from the multi-function peripheral 10 in S221. Then, when the read date/time information is included in the specific date, the CPU 72 selects the boost upload process. On the other hand, when the read date/time information is not included in the specific date, the CPU 72 selects the normal upload process.

A specific example of the seventh processing example will be explained. When the selected application is the B application 282, the CPU 72 determines that the predetermined specific date of "November to the following January" is associated with the B application 282. Then, when the date/time indicated by the date/time information included in the supplementary information falls within the period "November to the following January", the CPU 72 selects the boost upload process. On the other hand, when the date/time indicated by the date/time information falls outside of the period "November to the following January", the CPU 72 selects the normal upload process.

The eighth processing example will be explained. The CPU 72 selects the normal upload process when the processing content indicate by the print processing identification information received from the multi-function peripheral 10 in S248 is final printing process. On the other hand, the CPU 72 selects the boost upload process when the processing content indicate by the print processing identification information received from the multi-function peripheral 10 in S248 is trial printing process.

When the first selection processing of S282 is complete, the processing proceeds to S283. In S283, the CPU 72 executes a determination process. The determination process is a process for determining whether or not a reduction process for reducing the size of the image data (S310) is executed by the boost server 300 when the boost upload process is executed. The determination process will be explained in detail. When the selected image processing indicated by the application identification information is processing executed on image data generated by the scan process, in the determination process, a determination is made not to execute the reduction process. On the other hand, when the selected image processing indicated by the application identification information is processing executed on image data stored in the media, in the determination process, a determination is made to execute the reduction process.

In S283, the CPU 72 executes a decision process for deciding a prescribed pixel size. The prescribed pixel size is information used as a reference when reducing the image data in the reduction process (S310), which will be described later. The decision process will be explained in detail. When the selected image processing is image processing for synthesizing an image displayed in accordance with the upload data in a specific field disposed in a portion of the selected template image, in the decision process, the CPU 72 decides on a prescribed pixel size that corresponds to the size of the specific field. The B application 282 corresponds to the program for executing this kind of selected image processing. On the other hand, when the selected image processing is image processing for creating processing data that corresponds to a prescribed paper size by performing synthesis so as to superimpose an image displayed in accordance with the upload data onto the selected template image, in the decision process, the CPU 72 decides that the prescribed pixel size is to be identical to the pixel size of the image corresponding to the prescribed paper size. The A application 281 and the C application 283 correspond to programs for executing this kind of selected image processing. The prescribed pixel size corresponding to the A application 281 and the C application 283 may be a pixel size suitable for printing on a postcard at 300 dpi.

In S285, the CPU 72 determines the result selected in the first selection process. When the normal upload process has been selected, the processing proceeds to S577.

In S577, the CPU 72 creates a communication format of the upload message. The communication format of the upload message is a template for a message when uploading upload data to the conversion server 200.

In S579, the CPU 72 sends second instruction information and the communication format of the upload message to the multi-function peripheral 10. The second instruction information is information for causing the normal upload process to be executed on the multi-function peripheral 10. The second instruction information includes an image processing upload destination URL. The URL of the conversion server 200 can be cited as an example of the image processing upload destination URL.

In S581, the CPU 22 creates an upload message based on the received communication format, the received image processing upload destination URL, and the upload data created in S565. Specifically, the multi-function peripheral 10 stores binary data as the upload data, the image processing upload destination URL, and various other information such as the data size of the upload data, at prescribed positions in the communication format received from the mediation server 60. By this means, an upload message suitable for the conversion server 200 can be created.

In S583, the CPU 22 sends the upload message to the conversion server 200. At this time, the upload message is sent to the conversion server 200 without going through the boost server 300. That is, the normal upload process is executed. In S585, the CPU 272 of the conversion server 200 sends image processing upload result information to the multi-function peripheral 10. The image processing upload result information is information indicating whether the upload data was normally uploaded to the conversion server 200. Then, the process proceeds to S587.

On the other hand, when the boost upload process has been selected in S285, the processing proceeds to S290. In S290, the CPU 72 creates the communication format of the upload message.

In S295, the CPU 72 sends first instruction information and the communication format of the upload message to the multi-function peripheral 10. The first instruction information is information for causing the multi-function peripheral 10 to execute the boost upload process. The first instruction information includes the URL of the boost server 300 and the URL of the conversion server 200.

In S295, the CPU 72 associates fourth instruction information and the prescribed pixel size decided in accordance with the decision process (S283) with the first instruction information, and sends same to the multi-function peripheral 10. The fourth instruction information is information for instructing the boost server 300 to execute a reduction process for reducing the size of the upload data when the pixel size of the image displayed in accordance with the upload data is larger than the prescribed pixel size.

In S295, the CPU 72 determines whether or not selected image processing is to be executed on upload data read from the media. Specifically, the CPU 72 makes an affirmative determination when the selected application can only use, as the output image data, image data stored in the media mounted in the multi-function peripheral 10. Or, the CPU 72 makes an affirmative determination when the media identification information has been received in S226. Then, when an affirmative determination is made, the CPU 72 associates fifth instruction information with the first instruction information, and sends same to the multi-function peripheral 10.

The fifth instruction information is information for instructing the boost server 300 to execute a reduction process.

In S300, the CPU 22 of the multi-function peripheral 10 creates an upload message. Included in the upload message are the binary data of the upload data, data size information indicating the data size of the upload data, the URL of the boost server 300 and the URL of the conversion server 200, prescribed pixel size information indicating the prescribed pixel size, the first instruction information, and the fourth instruction information. There are cases where the fifth instruction information is also included in the upload message. In S305, the CPU 22 sends the upload message to the boost server 300. The boost server 300 receives the upload message.

Here, the boost server 300 may receive the upload message in a variety of configurations. Examples of reception configurations are enumerated below. (Example 1) The upload data, the URL of the boost server 300 and the URL of the conversion server 200, and the prescribed pixel size and the data size of the upload data may be received in the same packet. (Example 2) The URL of the boost server 300 and the URL of the conversion server 200, and the prescribed pixel size and the data size of the upload data may be included in the header of the upload data. (Example 3) The URL of the boost server 300 and the URL of the conversion server 200, and the prescribed pixel size and the data size of the upload data may be received in succession in different packets than the upload data packet. (Example 4) The upload data, the URL of the boost server 300 and the URL of the conversion server 200, and the prescribed pixel size and the data size of the upload data may be received during the same communication session. (Example 5) The URL of the boost server 300 and the URL of the conversion server 200, and the prescribed pixel size and the data size of the upload data may be received in a packet that includes either the upload data identification information or the identification information for the upload data packet.

In S310, the CPU 372 of the boost server 300 executes a reduction process. The reduction process is a process for reducing the pixel size of the upload image represented by the upload data. Reduced image data that has been reduced by the reduction process is generated.

(Reduction Process)

The contents of the reduction process performed in S310 will be explained using FIG. 8. In S10, the CPU 372 of the boost server 300 determines whether or not a determination as to the propriety of executing a reduction process is required. This determination is performed in accordance with whether or not the fourth instruction information or the fifth instruction information is included in the upload data received in S305. When a negative determination is made (S10: NO), the CPU 372 ends the reduction process, and when an affirmative determination is made (S10: YES), the processing proceeds to S20.

In S20, the CPU 372 determines whether or not the data size of the upload data is larger than a predetermined prescribed data size. One megabyte is an example of the prescribed data size. Specifically, the CPU 372 makes the determination by comparing the data size indicated by the data size information included in the upload message received in S305 to the prescribed data size. Moreover, the data size indicated by the information included in the upload data (e.g., header information) may be used as the data size of the upload data. When a negative determination is made (S20: NO), the CPU 372 ends the reduction processes. On the other hand, when an affirmative determination is made (S20: YES), it is determined to be a case where a reduction process is executed, and the processing proceeds to S25.

In S25, the CPU 372 receives the prescribed pixel size information included in the upload message received in S305. In S30, the CPU 372 receives information indicating the pixel size of the upload image represented by the upload data (that is, the height and width of the upload image). Specifically, the CPU 372 receives information indicating the pixel size of the upload image and information indicating the number of pixels, which is included in the header information of the upload data. That is, the multi-function peripheral 10, when creating the scan image data, includes in the scan image data header information including information indicating the pixel size of the scan image data and information indicating the number of pixels. Further, information indicating the pixel size of the media image data and information indicating the number of pixels is included as header information in the media image data.

In S40, the CPU 372 determines whether or not the pixel size of the upload image is larger than the prescribed pixel size. This determination will be explained in detail. A determination of "the pixel size of the upload image is larger than the prescribed pixel size" is made when the horizontal pixel size of the upload image is larger than the horizontal pixel size indicated by the prescribed pixel size information, and the vertical pixel size of the upload image is larger than the vertical pixel size indicated by the prescribed pixel size information. When a negative determination is made in S40 (S40: NO), the CPU 372 ends the reduction process, and when an affirmative determination is made (S40: YES), the processing proceeds to S45.

In S45, the CPU 372 determines whether or not the number of pixels of the upload image is larger than the prescribed number of pixels. A specific example of the prescribed number of pixels is two million pixels. When the number of pixels of the upload image is smaller than the prescribed number of pixels (S45: NO), the CPU 372 ends the reduction process, and when an affirmative determination is made (S45: YES), the processing proceeds to S50. The information indicating the number of pixels of the upload image may be information that indicates the number of vertical pixels and the number of horizontal pixels. When a value obtained by multiplying the number of vertical pixels and the number of horizontal pixels of the upload image is larger than the prescribed number of pixels, it is determined that the number of pixels of the upload image is larger than the prescribed number of pixels (S45: YES).

In S50, the CPU 372 calculates a reduction ratio of the upload image. This calculation will be explained in detail. A reduced image obtained by reducing the upload image has a rectangular shape. The reduced image comprises a first side in the width direction, and a second side in the height direction, the second side being orthogonal to the first side. Further, the prescribed pixel size indicates a prescribed first length, which is the length of the first side, and a prescribed second length, which is the length of the second side. The reduction ratio is calculated so that the length of the first side of the reduced image is the same as the prescribed first length, and the length of the second side is longer than the prescribed second length. Or, the reduction ratio is calculated so that the length of the second side of the reduced image is the same as the prescribed second length, and the length of the first side is longer than the prescribed first length.

In S55, the CPU 372 performs data decompression on upload data that was compressed using the joint photographic experts group (referred to as JPEG) technique. Portable network graphics (referred to as PNG) and graphics interchange format (referred to as GIF) can be cited as other examples of upload data compression techniques. In S60, the CPU 372 executes reduction processing on the upload data on the basis of the reduction ratio calculated in S50. Thus, reduced image data is obtained. The pixel size of the reduced image represented by the reduced image data (that is, the height and width of the image) is smaller than the pixel size of the upload image represented by the upload data. In S65, the CPU 372 generates reduced upload data by performing data compression on the reduced image data using the same technique as that used on the upload data prior to reducing the pixel size. Then the CPU 372 ends the reduction process. Data compression may be performed using a technique that differs from that used on the pre-reduction upload data.

(Operation of Communication System (Part 2))

The explanation will return to FIG. 4. In S315, the CPU 372 of the boost server 300 sends an upload message to the conversion server 200. When the reduction processing of S60 has been performed, reduced upload data is included in the upload message, and when the reduction processing of S60 has not been performed, unreduced upload data is included in the upload message. That is, the upload message is sent to the conversion server 200 via the boost server 300. Hence, the boost upload process is executed.

In S320, the CPU 272 sends image processing upload result information to the boost server 300. In S325, the CPU 372 sends the image processing upload result information to the multi-function peripheral 10. Then, the processing proceeds to S587.

In S587, the CPU 22 of the multi-function peripheral 10 sends the received image processing upload result information and continuing capability determination request information to the mediation server 60. The continuing capability determination request information is information for requesting the mediation server 60 to determine whether the image processing can be continued.

In S589, the CPU 72 of the mediation server 60 decodes the image processing upload result information, and creates a decoding result. The image processing upload result information is information sent from the conversion server 200 to the multi-function peripheral 10, and thus has specifications peculiar to the conversion server 200. Hence, by using a decoding program, not shown, included in the program 75 stored by the mediation server 60, the image processing upload result information can be decoded. A decoding result is a message in a format decodable by the multi-function peripheral 10. The decoding result includes an image processing upload result included in the decoded image processing upload result information. Further, based on the decoding result, the CPU 72 creates continuing capability information, which is information about whether image processing can continue. For example, when the decoding result indicates that an upload process failed, continuing capability information is generated which indicates that image processing can not continue. In S591, the CPU 72 sends the decoding result and the continuing capability information to the multi-function peripheral 10.

In S593, the CPU 22 of the multi-function peripheral 10 determines whether the image processing can continue based on the continuing capability information. When a negative determination is made (S593: NO), the flow ends, and when a positive determination is made (S593: YES), the process proceeds to S595.

In S595, the CPU 22 of the multi-function peripheral 10 determines whether scan image data exists for which the upload process has not been executed. When a positive determination is made (S595: YES), the process returns to S271, and when a negative determination is made (S595: NO), the process proceeds to S597. In S597, the CPU 22 sends, to the mediation server 60, upload completion notification information indicating that the process of uploading the scan image data to the conversion server 200 is completed.

In S601, the CPU 72 determines whether or not the content of the output image represented by the upload data that was uploaded to the conversion server 200 is sufficient content for performing image processing using the selected application. Specifically, when the selected application is the A application, an attempt is made to extract image data representing the feature part from the output image, and a determination is made as to whether or not extraction was possible. When the selected application is the C application, an attempt is made to extract image data representing a specific field from the output image, and a determination is made as to whether or not extraction was possible. When the selected application is the D application, an attempt is made to perform OCR on the output image, and a determination is made as to whether or not OCR was possible. Further, when the selected application is the D application, an attempt is made to extract image data representing the sender's name, the sender's address, the addressee's name and the addressee's address from the output image, and a determination is made as to whether or not extraction was possible. When a negative determination is made (S601: NO), the process proceeds to S603. In S603, the CPU 72 sends the error notification screen data to the multi-function peripheral 10. In S605, the CPU 22 of the multi-function peripheral 10 causes the error notification screen to be displayed on the display unit 14. For example, "Number of documents read do not meet required number" may be displayed on the error notification screen. Then the flow ends.

On the other hand, when a positive determination is made in S601 (S601: YES), the process proceeds to S619. In S619, the CPU 72 sends first image processing request information, application identification information, and template identification information to the conversion server 200. The first image processing request information is information for requesting image processing to be executed on upload data identified by the data ID for image processing upload received in S253 (i.e., the upload data uploaded to the conversion server 200 in S583 or S315). The application identification information and the template identification information may be converted to a format that is recognizable by the conversion server 200. For example, the application identification information and the template identification information may be described using the URL description technique.

In S621, the CPU 272 of the conversion server 200 sends processed data reception information to the mediation server 60. The processed data reception information may include an image processing job ID. The image processing job ID is information for identifying image processing which is executed in response to a process (S619) requesting the execution of image processing. The processed data reception information may be described by a URL description method.

In S623, the CPU 272 determines whether the selected template image identified by the template identification information is the third template image for the C application. When a positive determination is made (S623: YES), the process proceeds to S624. In S624, the CPU 272 reads the selected template image data from among the third template image data 123 stored in the template storage area 276. Then, the image processing is started using the C application 283. Then, the process proceeds to S631.

On the other hand, when a negative determination is made in S623 (S623: NO), the process proceeds to S625. In S625, the CPU 272 sends template reception request information to the contents server 100. The template reception request information is information for obtaining the selected template image data identified by the template identification information from the contents server 100. In S627, the CPU 272 obtains the selected template image data from the contents server 100. Then, the image processing is started using the A application 281 or the B application 282. Then, the process proceeds to S631.

The processes S631 to S651 are processes which, when image processing for uploading data is started, cause the multi-function peripheral 10 to wait until the completion of the aforementioned image processing for the uploading. The conversion server 200 executes the image processing on the upload data in response to the first image processing request information received in S619. The image processing may be executed on each of upload data divided into prescribed data amounts (e.g., 100 KB). Further, the prescribed data amount may be a data amount suitable for image processing.

In S631, the CPU 72 of the mediation server 60 sends image processing completion confirmation request information to the conversion server 200. The image processing completion confirmation request information is information for confirming with the conversion server 200 whether the image processing requested from the conversion server 200 in S619 has been completed. In order to identify the image processing, the CPU 72 includes, in the image processing completion confirmation request information, the processed data reception information sent by the conversion server 200 in S621.

In S632, the CPU of the conversion server 200 determines whether the image processing has been completed. Specifically, the image processing that is to be performed on the processed data reception information included in the image processing completion confirmation request information is specified to be the image processing for determining whether the image processing can be completed. Then, it is determined whether the conversion of a prescribed data amount from a beginning part of the upload data has been completed in the specified image processing. Specifically, in regards to the image processing executed for 100K bytes at a time, it is determined whether this processing of 100K bytes has been completed; and similarly, in regards to the image processing that processes all the upload data, it is determined whether the image processing for all the upload data has been completed. In case the image processing has not been completed (S632: NO), the process proceeds to S633.

In S633, the CPU sends to the mediation server 60 image processing incomplete notification information indicating that conversion processing has not completed. In S635, the CPU 72 of the mediation server 60 generates a wait command in response to the reception of the image processing incomplete notification information. The wait command is a command to cause the multi-function peripheral 10 to wait for the completion of the conversion processing.

In S637, the CPU 72 sends the wait command to the multi-function peripheral 10. In S639, the CPU 22 of the multi-function peripheral 10 executes wait processing to wait for the completion of the image processing. The wait processing may for example be processing in which a timer which had been started to detect a timeout of the image processing is reset and again started. Or, for example, the wait processing may be processing in which the time until timeout of image processing is lengthened by increasing the timeout time stored in memory 24 such that the time until timeout of image processing is extended.

In S641, the CPU 22 sends to the mediation server 60 the wait processing completion information indicating that wait processing execution has completed. Then the process returns to S631.

However, when in S632 it is determined that the image processing has completed (S632: YES), the process proceeds to S651. In S651, the CPU 272 of the conversion server 200 sends to the mediation server 60 the image processing completion notification information indicating that the image processing of a prescribed data amount in the leading portion of the upload data has completed.

The process S753 to S973 is a process for causing the multi-function peripheral 10 to process the processed data that has undergone image processing by the conversion server 200. In S753, the CPU 72 of the mediation server 60 generates processed data reception command information. The processed data reception command information is information notifying the multi-function peripheral 10 that image processing by the image processing module which is last in the image processing sequence has completed a prescribed data amount of the beginning part (S732: YES).

In receiving the processed data reception command information, in S757 the CPU 72 sends the processed data reception command information to the multi-function peripheral 10. The processed data reception command information may be described by a Uniform Resource Locator (referred to as URL) description method. In S759, the CPU 22 of the multi-function peripheral 10 sends download source URL request information and the processed data reception information request information to the mediation server 60. The download source URL request information is information to request of the mediation server 60 a first download source URL to access processed data for which image processing completion confirmation was executed in S631. Further, the processed data reception information request information is information for identifying the job which has generated the processed data for which image processing completion confirmation was executed in S631.

In S780, the CPU 72 of the mediation server 60 executes a second selection process. The second selection process is a process for selecting which of the aforementioned download processes, i.e., the boost download process or the normal download process, is to be used. The second selection process can take various processing modes. A ninth processing example and a tenth processing example are described below as specific examples of the second selection process.

The ninth processing example will be explained. The CPU 72 identifies the region indicated by the forwarding information included in the supplementary information received from the multi-function peripheral 10 in S221. Then, when the region indicated by the forwarding information is a predetermined specific region, the CPU 72 selects the boost download process. On the other hand, when the region indicated by the forwarding information is a region other than a specific region, the CPU 72 selects the normal download process.

The tenth processing example will be explained. The CPU 72 reads the date/time information included in the supplementary information received from the multi-function peripheral 10 in S221. Then, when the read date-time information indicates a predetermined specific time point, the CPU 72 selects the boost download process. On the other hand, when the read date-time information does not indicate the specific time point, the CPU 72 selects the normal download process. Furthermore, since a specific example of the specific time point has already been explained in the above-described fifth processing example, an explanation will be omitted here.

In S785, the CPU 72 determines the result of the selection made in the second selection process. When it is determined that the normal download process was selected (S785: Normal Download), the processing proceeds to S961.

In S961, the CPU 72 generates a download source URL and processed data reception information for receiving processed data from the conversion server 200, and sends same to the multi-function peripheral 10. Included in the processed data reception information is also processing content information indicating which processing, i.e., the print preview process, the trial printing process, or the final printing process, is to be executed. The processing content information can be generated on the basis of the print preview display flag stored in S239 and/or the print process identification information received from the multi-function peripheral 10 in S248.

In S963, download request information to download the processed data identified by the processed data reception information is sent, based on the first download source URL, to the conversion server 200 by the CPU 22 of the multi-function peripheral 10. In S965, the CPU 272 of the conversion server 200 sends the processed data specified by the download request information to the multi-function peripheral 10. That is, the processed data is sent to the multi-function peripheral 10 without going through the boost server 300. Hence, the normal download process is executed.

In the conversion server 200, when the image processing is executed for 100 KB at a time, in S965 the processed data may be sent 100 KB at a time to the multi-function peripheral 10 in response to the download request information sent in S763. In this case, the CPU 22 of the multi-function peripheral 10 may repeat the sending of the download request information of S963, and repeat the receiving of the processed data of S965 until the minimum data amount which can undergo print processing by the print executing unit has been received. The minimum data amount which can undergo print processing by the print executing unit may be an amount sufficient to cause one carriage pass of an ink head in case the print executing unit 18 is an ink jet printer, and an amount sufficient to print one page of printing paper in case the print executing unit 18 is a laser printer.

In S967, the CPU 22 of the multi-function peripheral 10 executes image processing on the basis of the processed data. Specifically, the CPU 22 executes the processing specified by the processing content information from among the print preview display process, the trial printing process, and the final printing process. When the trial printing process and/or the final printing process is executed, the print process may be executed using the smallest unit capable of printing the print data. For example, in case the print executing unit 18 is the ink jet printer, the print process may be executed in units of lines. In case the print executing unit 18 is the laser printer, the print process may be executed in one page units of printing paper. Then, the process proceeds to S968.

On the other hand, when it has been determined that the boost download process was selected in S785 (S785: Boost Download), the processing proceeds to S795. In S795, the CPU 72 generates a download source URL for receiving the processed data from the conversion server 200 via the boost server 300. Then, the CPU 72 sends the download source URL and the processed data reception information to the multi-function peripheral 10.

In S805, the CPU 22 of the multi-function peripheral 10 sends download request information to the boost server 300 on the basis on the download source URL. In S815, the CPU 372 of the boost server 300 sends the received download request information to the conversion server 200. In S820, the CPU 372 receives the processed data specified by the download request information from the conversion server 200. In S825, the CPU 372 sends the received processed data to the multi-function peripheral 10. That is, the processed data is sent to the multi-function peripheral 10 via the boost server 300. Hence, the boost download process is executed.

In S830, the CPU 22 of the multi-function peripheral 10 executes image processing on the basis of the processed data. Since the specific contents of the image processing were already explained in S967, an explanation will be omitted here. Then, the processing proceeds to S968.

In S968, the CPU 22 determines whether or not there exists processed data for which image processing has not been executed. When an affirmative determination is made (S968: YES), the processing returns to S759, and when a negative determination is made (S968: NO), the processing proceeds to S969. In S969, the CPU 22 sends image processing completion notification information, which indicates that image processing has been completed, to the mediation server 60.

In S970, the CPU 72 of the mediation server 60 determines whether or not the image processing executed in S967 was a final printing process. When a negative determination is made (S970: NO), the processing returns to S242, and when an affirmative determination is made (S970: YES), the processing proceeds to S971. Moreover, when the processing returns to S242 in accordance with the negative determination made in S970, the CPU 72 generates print process selection screen data that includes a final printing button image, and a cancel button image corresponding to cancel. When receiving print process identification information indicating that the cancel button image was selected in S248, the CPU 72 proceeds to S971. When receiving print process identification information indicating that the final printing button image was selected in S248, the CPU 72 proceeds to S251. In S971, the CPU 72 of the mediation server 60 sends processing completion notification information to the multi-function peripheral 10. In S973, the CPU 22 of the multi-function peripheral 10 displays a completion screen on the display unit 14. Then the flow ends.

(Effects)

Either the boost upload process or the normal upload process can be selected when the image data is uploaded from the multi-function peripheral 10 to the conversion server 200 (S282). In the boost upload process, image data can be sent to the conversion server 200 via the boost server 300. Because the boost server 300 and the conversion server 200 are connected via a virtual internal network, the communication speed of the boost upload process is faster than that of the normal upload process. Consequently, the shortened communication time made possible by using the boost upload process to send image data should reduce the sense of incongruity on the part of the user of the multi-function peripheral 10 resulting from communication wait time. Thus, it is possible to efficiently upload the image data to the conversion server 200. Similarly, either the boost download process or the normal download process can be selected when downloading image data from the conversion server 200 to the multi-function peripheral 10 (S780). This makes it possible to also efficiently download image data from the conversion server 200.

The effect of the processing explained in the first processing example will be explained. The normal upload process can be selected when uploading the scan image data. On the other hand, the boost upload process can be selected when uploading the media image data. The size of the scan image data is a size that can be estimated to a certain degree from the specifications of the scan executing unit 19 of the multi-function peripheral 10. On the other hand, the size of the media image data cannot be estimated since this size is determined freely by the user. Consequently, when the media image data is photographic data or the like, a case can occur in which the size of the media image data is much larger than that of the scan image data. Hence, a reduction process (S310) can be executed on the media image data by performing the boost upload process on the media image data. This makes it possible for an image data communication to be carried out smoothly even when the media image data is enormous in size.

The effect of the processing explained in the second processing example will be explained. When executing the process for synthesizing the template image data to the image data (S227: YES), the boost upload process can be selected. The data size of the image data that is synthesized with the template image data is relatively large. This is because it is mostly photographic data. Consequently, using the boost upload process makes it possible to carry out data communication smoothly. On the other hand, when executing image processing to process text that is included in the image data (S227: NO), the normal upload process can be selected. In most cases, the data size of image data that includes text is smaller than that of image data that does not include text (e.g., photographic data). Consequently, it is possible to carry out data communications smoothly even using the low-communication-speed normal upload process.

The effects of the processing explained in the third and fourth processing examples will be explained. When the region in which the multi-function peripheral 10, which is the source of the supplementary information, is installed is a predetermined specific region (e.g., Japan), the boost upload process can be selected. There are cases where applications that use large-sized image data (e.g., applications for creating New Year's cards) can only be used in a specific region. In a case like this, using the boost upload process makes it possible to carry out data communications smoothly.

The effect of the processing explained in the fifth processing example will be explained. When the time of an access from the multi-function peripheral 10 is a specific time slot in a day (e.g., business hours from 9 am to 6 pm), the boost upload process can be selected. Using the boost upload process makes it possible to carry out data communications smoothly even when the data communications are concentrated in a specific time slot. Further, a determination can be made as to whether or not a data communication is within the specific time slot on the basis of the local time in the region where the multi-function peripheral 10 is installed. Hence, it is possible to make a more accurate determination as to the propriety of using the boost upload process. Further, when the date of an access from the multi-function peripheral 10 is a specific period of time in a year (e.g., the New Year's card season from November to the following January), the boost upload process can be selected. Using the boost upload process makes it possible to carry out data communications smoothly even when the data communications are concentrated in a specific period of time.

The effect of the processing explained in the sixth processing example will be explained. When a selected application (e.g., the B application 282) that is associated with a specific region has been selected, the boost upload process can be selected when the multi-function peripheral 10 is installed in the specific region. In other words, when an application for creating New Year's cards has been selected, the boost upload process can be selected when the multi-function peripheral 10 is disposed in a region where creating New Year's cards is a custom. The creation of New Year's cards is concentrated at the end of the year. Consequently, an enormous amount of data communications occurs during a short period of time at the end of the year. Thus, in the case of image data communications for creating New Year's cards, using the boost upload process makes it possible to carry out the image data communications smoothly.

The effect of the processing explained in the seventh processing example will be explained. When a selected application (e.g., the B application 282) that is associated with a predetermined specific date (e.g., November to the following January) has been selected, the boost upload process can be selected when the application identification information has been sent from the multi-function peripheral 10 during a period of time included in the specific date. In other words, when an application for creating New Year's cards has been selected, the boost upload process can be selected when access from the multi-function peripheral 10 takes place during the period of time for creating the New Year's cards. This makes it possible to carry out image data communications smoothly by using the boost upload process during the New Year's cards creation period when enormous amounts of data communications occur during a short period of time.

The effect of the processing explained in the eighth processing example will be explained. When uploading image data for a final printing process, the normal upload process can be selected. On the other hand, when uploading image data for a trial printing process, the boost upload process can be selected. In the case of the final printing process, the user is not required to check the printing results and provide feedback to the print setting. The multi-function peripheral 10 can be left as-is from the time the user instructs final printing until the printing is complete. Consequently, selecting the normal upload process with its relatively slow communications speed makes it possible to avoid a situation in which the boost upload route becomes congested. On the other hand, in the case of the trial printing process, the user is required to check the printing results. Consequently, using the boost upload process can reduce user wait time. User convenience can be enhanced.

According to the communication system 2 described in the present specification, the multi-function peripheral 10 can be made to execute an upload process (S305, S583) by outputting the URL of the boost server 300 and the URL of the conversion server 200 from the mediation server 60 to the multi-function peripheral 10 (S295, S579). The URL is a universally used protocol. Consequently, the need to provide a dedicated protocol for communications between the mediation server 60 and the multi-function peripheral 10 can be eliminated.

There are cases where the conversion server 200 and the multi-function peripheral 10 are installed in different regions, and the distance between the two is great. For example, there are cases where the multi-function peripheral 10 and the boost server 300 are installed in Japan, and the conversion server 200 is installed in a region outside of Japan. In a case like this, the total communication time can be shortened by communicating image data between the multi-function peripheral 10 and the conversion server 200 via the boost server 300. This is because the boost server 300 and the conversion server 200 are connected via a virtual internal network and communicate at high speed.

According to the communication system 2 described in the present specification, the mediation server 60 can be made to execute a variety of selection processes and the conversion server 200 can be made to execute image processing. Since the device for executing a selection process and the device for executing image processing can be separate entities, it is possible to prevent selection processes from being affected by the image processing executed by the conversion server 200 when the mediation server 60 undergoes maintenance or the like.

While specific embodiments of the present invention have been described in detail above, such description is for illustrative purposes only and is not intended to limit the scope and claims of the invention. Techniques described in the claims of the invention include various modifications and changes made to the specific examples illustrated above. Variants according to the above embodiments are listed below.

(Variants)

The process for causing the display unit 14 of the multi-function peripheral 10 to display the error notification screen may be omitted. In this case, S272 to S276 may be omitted, and the process may proceed from S271 to S282. Further, S601 to S605 may be omitted, and the process may proceed from S597 to S619. The third template image data 123 may be stored in the template storage area 102 of the contents server 100. In this case, S623 and S624 may be omitted. From the above, generally speaking, the mediation server 60, the conversion server 200 and the contents server 100 may perform at least "receiving first information", "selecting one of a first processing and a second processing", "sending first instruction information", "sending second instruction information", "receiving first image data", and "generating second image data". As a specific example, the mediation server 60, the conversion server 200 and the contents server 100 may execute at least S221, S282, S295, S579, S315 or S583, and S619.

A form was described in which in S229 the CPU 72 of the mediation server 60 requests the template list information from the contents server 100, but the form is not limited to this. There may also be a form in which at least a part of the template list information is retained in the mediation server 60 or the conversion server 200. As a specific example, the template list information of the first template image data 121 and the second template image data 122 may be retained in the contents server 100, and the template list information of the third template image data 123 may be retained in the conversion server 200. In this case, the CPU 72 of the mediation server 60 may identify the selected application based on the application identification information received in S221 in FIG. 2. Then, when the selected application is the A application 281 or the B application 282, the template list information reception request information may be sent to the contents server 100. Further, when the selected application is the C application 283, the template list information reception request information may be sent to the conversion server 200.

The number of applications that is stored in the conversion server 200 is not limited to the four applications which are the A application 281 to the D application 284. The number of applications may be two or less, or five or more. The number of template images listed in the template selection screen 212 is not limited to the three templates x to z. The number of template images may be two or less, or four or more.

The image processing upload destination URL which the CPU 72 sends to the multi-function peripheral 10 in S579 is not limited to a URL of a conversion server but a URL of a recording medium which the conversion server can access.

In the present embodiment, a case was explained in which a boost server 300 is connected to the Internet 6; but two or more boost servers may be connected to the Internet 6.

The button image data for displaying the button images B11 to B14 included in the application selection screen 211 displayed in S220 can be received in a variety of modes. For example, information for accessing bitmap information for displaying the images of the button images B11 to B14 may be included in the application selection screen data received from the mediation server 60. The CPU 22 can receive the bitmap information from the mediation server 60, and display the application selection screen 211 on the display unit 14 on the basis of this information.

The installation mode of the contents server 100 may vary. For example, the contents server 100 may be installed over the second region A2. The contents server 100 may be a single server, or may be the same server as the mediation server or the conversion server.

The information in which the upload message communicated in S305 is included may come in a variety of combinations. For example, the upload message may include at least either the data size of the upload data or the prescribed pixel size.

Figure 8:
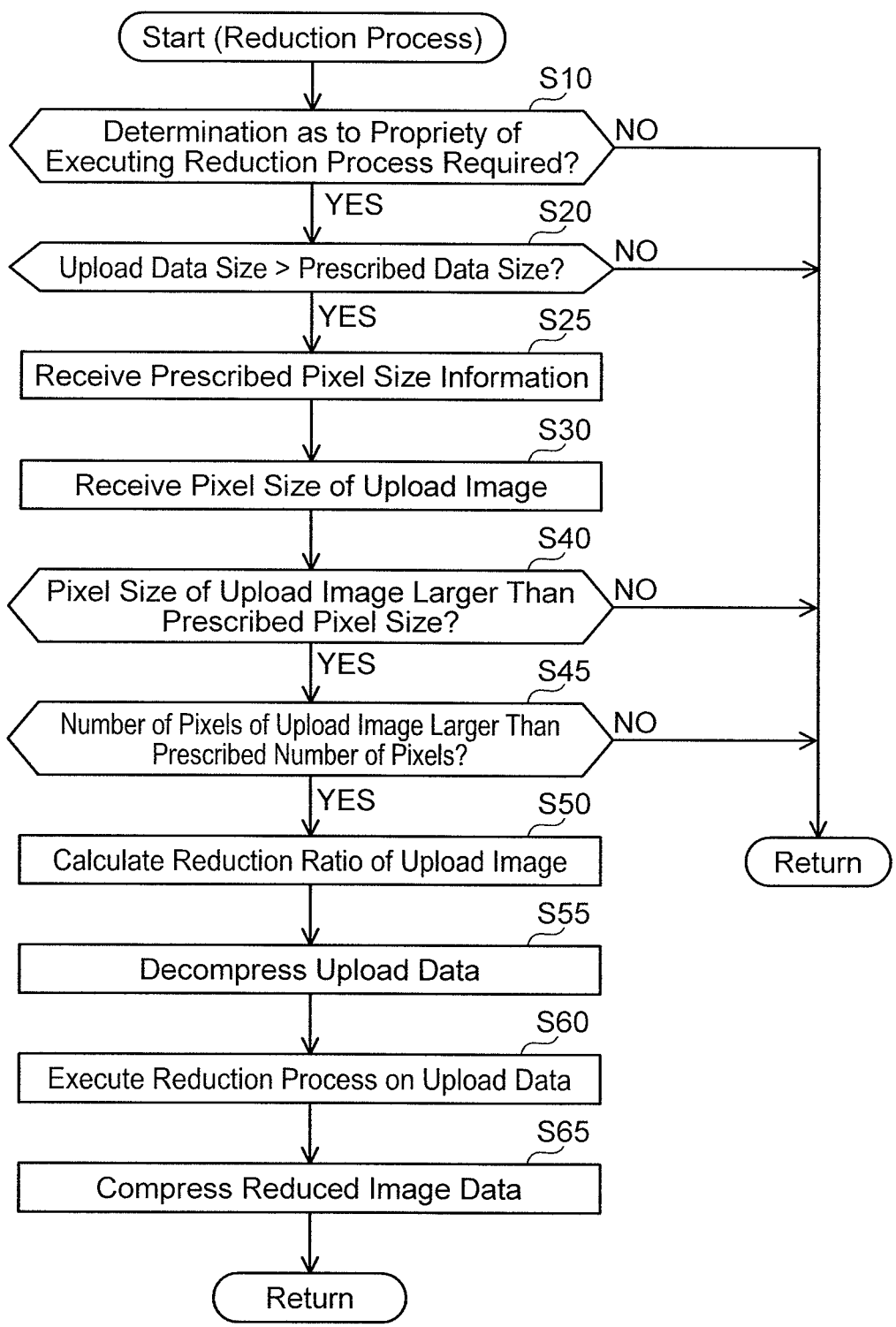
FIG. 8 shows a flowchart illustrating processing contents of a reduction processing.
Figure 9:
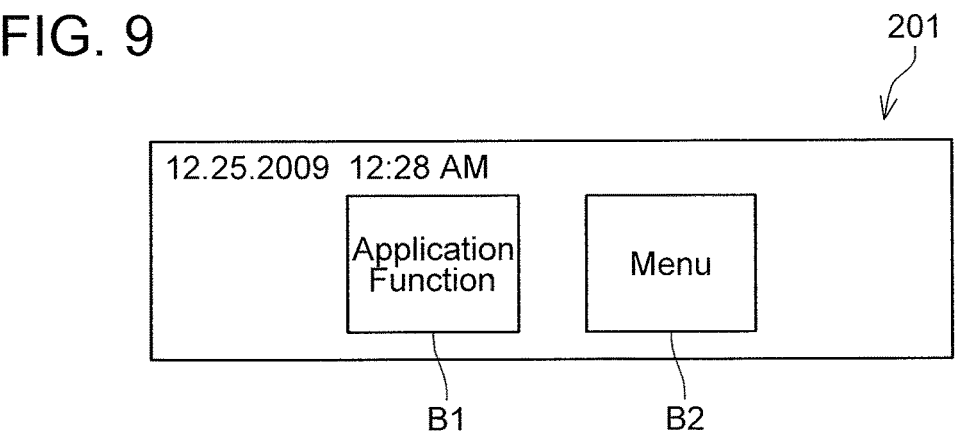
FIG. 9 shows an example of a main screen display.

In FIG. 8, a case in which the reduction processing of S60 is executed when S20, S40, and S45 are all YES was explained, but the present invention is not limited to this configuration. The reduction processing of S60 may be executed when at least any one of S20, S40, or S45 is YES. Further, the method of calculating the reduction ratio implemented in S50 may differ when S20 is YES, when S40 is YES, and when S45 is YES. For example, when S20 is YES, the reduction ratio may be calculated in S50 so that the data size of the post-reduction upload data is equal to or less than the prescribed data size. Further, when S60 is YES, for example, the reduction ratio may be calculated in S50 so that the number of pixels of the post-reduction upload data becomes the prescribed number of pixels.

In the embodiment, the case is described in which the CPUs 22, 72, 272, and 372 of the multi-function peripheral 10, the mediation server 60, the conversion server 200, and the boost server 300 execute processing according to software, but is not limited thereto. At least a part of functions provided according to the software may be provided by hardware such as a logic circuit.

What is claimed is:

1. A relay device configured to electrically connect with an image processing device and a server device through the Internet, the relay device comprising:
   a network interface;
   a processor coupled to the network interface; and
   a memory storing computer-readable instructions,
   wherein the computer-readable instructions, when executed by the processor, cause the relay device to perform:
   receiving first information and second information from the image processing device via the network interface, the first information being information identifying a selected image processing,
   the selected image processing being at least one type of image processing selected in the image processing device from among plural types of image processing that are to be executed on first image data outputted from the image processing device, and
   the second information being information including plural kinds of information related to the image processing device;
   selecting one of a first processing and a second processing based on at least one of the received first information and the received second information,
   the first processing being a processing in which the image processing device sends the first image data to the relay device via the server device and through the Internet, and
   the second processing being a processing in which the image processing device sends the first image data to the relay device not via the server device and through the Internet;
   sending, to the image processing device through the Internet, first instruction information causing the image processing device to execute the first processing in which the image processing device sends the first image data to the relay device via the server device when the first processing is selected;
   sending, to the image processing device through the Internet, second instruction information causing the image processing device to execute the second processing in which the image processing device sends the first image data to the relay device not via the server device when the second processing is selected;
   receiving the first image data from the image processing device via the server device and through the Internet after the sending of the first instruction information, or receiving the first image data from the image processing device not via the server device and through the Internet after the sending of the second instruction information; and
   generating second image data by executing the selected image processing on the first image data that has been received.

2. The relay device according to claim 1, wherein
the computer-readable instructions, when executed by the processor, cause the relay device to further perform determining a predetermined pixel size based on at least one of the first information and the second information, and
the sending of the first instruction information includes sending the determined predetermined pixel size and fourth instruction information in association with the first instruction information,
the fourth instruction information being information instructing the server device to execute reduction of a size of the first image data when a pixel size of an image displayed by the first image data is larger than the predetermined pixel size.

3. The relay device according to claim 2, wherein
the computer-readable instructions, when executed by the processor, cause the relay device to further perform receiving third information from the image processing device via the network interface,
the third information being information identifying selected third image data selected from among a plurality of third image data in the image processing device, the selected third image being to be composed with the first image data by the selected image processing, when the selected image processing is an image processing to compose the image displayed by the first image data with a specific area being a part of an image displayed by the selected third image data, the determining includes determining the predetermined pixel size so as to correspond to a size of the specific area.

4. The relay device according to claim 3, wherein the computer-readable instructions, when executed by the processor, cause the relay device to further perform sending, to the image processing device, third instruction information instructing the image processing device to obtain the second image data, when the selected image processing is an image processing to compose the image displayed by the selected third image data with the image displayed by the first image data so as to create the second image data corresponding to a predetermined paper size, the determining includes determining the predetermined pixel size so as to be identical with a pixel size of an image corresponding to the predetermined paper size, and the third instruction information includes information instructing the image processing device to print the second image data on a paper of the predetermined paper size.

5. The relay device according to claim 1, wherein the computer-readable instructions, when executed by the processor, cause the relay device to further perform:

judging whether or not to execute a reduction processing to reduce a size of the first image data in the server device when the first processing is executed, and sending, in association with the first instruction information, fifth instruction information instructing the server device to execute the reduction processing when it has been judged that the reduction processing is to be executed in the judging.

6. The relay device according to claim 5, wherein the judging includes:

judging not to execute the reduction processing when the selected image processing is a processing to be executed on the first image data that was generated by a scanner comprised in the image processing; and judging to execute the reduction processing when the selected image processing is a processing to be executed on the first image data that has been stored in a memory of the image processing device.

7. The relay device according to claim 1, wherein the computer-readable instructions, when executed by the processor, cause the relay device to further perform:

receiving, from the image processing device via the network interface, third information identifying selected third image data, the selected third image data being data selected from among a plurality of third image data and being to be composed with the first image data by the selected image processing; and obtaining the selected third image data identified by the received third information, the selecting of one of the first processing and the second processing includes:

selecting the first processing when the selected image processing is an image processing to compose the obtained selected third image data with the first image data; and selecting the second processing when the selected image processing is another image processing than the image processing to compose the obtained selected third image data with the first image data.

8. The relay device according to claim 1, wherein the relay device is located in a first geographical location, and the sending of the first instruction information includes sending the first instruction information causing the image processing device to execute the first processing, the first processing being a processing to send the first image data to the relay device via the server device located in the second geographical location different from the first geographical location.

9. The relay device according to claim 1, wherein the computer-readable instructions, when executed by the processor, cause the relay device to further perform:

selecting one of a third processing and a fourth processing based on at least one of the first information and the second information, the third processing being a processing in which the relay device sends the second image data to the image processing device via the server device, and the fourth processing being a processing in which the relay device sends the second image data to the image processing device not via the server device;

sending, to the image processing device, third instruction information instructing the image processing device to obtain the second image data from the relay device via the server device, when the third processing is selected; and the relay device includes a first device and a second device, the first device is configured to connect with the image processing device and the second device via the network, the second device is configured to connect with the server device via the network, the computer-readable instructions cause the first device to perform:

the receiving of the first information and the second information;

the selecting of one of the first processing and the second processing;

the sending of the first instruction information;

the sending of the second instruction information; and the sending of the third instruction information, and the computer-readable instructions cause the second device to perform:

the receiving of the first image data; and the generating of the second image data.

10. The relay device according to claim 9, wherein the second device and the server device are connected by a virtual private network.

11. A relay device configured to electrically connect with an image processing device and a server device via a network, the relay device comprising:

a network interface;

a processor coupled to the network interface; and a memory storing computer-readable instructions, wherein the computer-readable instructions, when executed by the processor, cause the relay device to perform:

receiving first information and second information from the image processing device via the network interface, the first information being information identifying a selected image processing, the selected image processing being at least one type of image processing selected in the image processing device from among plural types of image processing that are to be executed on first image data outputted from the image processing device, and the second information being information including plural kinds of information related to the image processing device;

selecting one of a first processing and a second processing based on at least one of the received first information and the received second information, the first processing being a processing in which the image processing device sends the first image data to the relay device via the server device, and the second processing being a processing in which the image processing device sends the first image data to the relay device not via the server device;

sending, to the image processing device, first instruction information causing the image processing device to execute the first processing when the first processing is selected;

sending, to the image processing device, second instruction information causing the image processing device to execute the second processing when the second processing is selected;

receiving the first image data from the image processing device via the server device after the sending of the first instruction information, or receiving the first image data from the image processing device not via the server device after the sending of the second instruction information;

generating second image data by executing the selected image processing on the first image data that has been received;

selecting one of a third processing and a fourth processing based on at least one of the first information and the second information, the third processing being a processing in which the relay device sends the second image data to the image processing device via the server device, and the fourth processing being a processing in which the relay device sends the second image data to the image processing device not via the server device;

sending, to the image processing device, third instruction information instructing the image processing device to obtain the second image data via the server device, when the third processing has been selected; and sending, to the image processing device, fourth instruction information instructing the image processing device to obtain the second image data not via the server device, when the fourth processing has been selected.

12. A communication system comprising a relay device, an image processing device and a server device, the relay device being configured to electrically connect with the image processing device and the server device through the Internet, wherein the image processing device performs sending first information and second information to the relay device, the first information being information identifying a selected image processing, the selected image processing being at least one type of image processing selected in the image processing device from among plural types of image processing that are to be executed on first image data outputted from the image processing device, and the second information being information including plural kinds of information related to the image processing device;

the relay device performs:

receiving the first information and the second information from the image processing device, selecting one of a first processing and a second processing based on at least one of the received first information and the received second information, the first processing being a processing in which the image processing device sends the first image data to the relay device via the server device and through the Internet, and the second processing being a processing in which the image processing device sends the first image data to the relay device not via the server device and through the Internet;

sending, to the image processing device through the Internet, first instruction information causing the image processing device to execute the first processing in which the image processing device sends the first image data to the relay device via the server device when the first processing is selected; and sending, to the image processing device through the Internet, second instruction information causing the image processing device to execute the second processing in which the image processing device sends the first image data to the relay device not via the server device when the second processing is selected, the image processing device further performs:

receiving the first instruction information from the relay device; and sending the first image data to the server device through the Internet when the first instruction information is received, the server device performs sending the first image data to the relay device through the Internet when the first image data is received from the image processing device, the image processing device further performs:

receiving the second instruction information from the relay device; and sending the first image data to the relay device through the Internet when the second instruction information is received from the relay device, the relay device further performs:

receiving the first image data from the server device through the Internet after the sending of the first instruction information, or receiving the first image data from the image processing device through the Internet after the sending of the second instruction information; and generating second image data by executing the selected image processing on the first image data that has been received.

13. The communication system according to claim 12, wherein the computer-readable instructions, when executed by the processor, cause the relay device to further perform determining a predetermined pixel size based on at least one of the first information and the second information, and the sending of the first instruction information includes sending the determined predetermined pixel size and fourth instruction information in association with the first instruction information, the fourth instruction information being information instructing the server device to execute reduction of a size of the first image data when a pixel size of an image displayed by the first image data is larger than the predetermined pixel size.

14. The communication system according to claim 13, wherein
the computer-readable instructions, when executed by the processor, cause the relay device to further perform receiving third information from the image processing device via the network interface,
the third information being information identifying selected third image data selected from among a plurality of third image data in the image processing device, the selected third image being to be composed with the first image data by the selected image processing,
when the selected image processing is an image processing to compose the image displayed by the first image data with a specific area being a part of an image displayed by the selected third image data, the determining includes determining the predetermined pixel size so as to correspond to a size of the specific area.

15. The communication system according to claim 14, wherein
the computer-readable instructions, when executed by the processor, cause the relay device to further perform sending, to the image processing device, third instruction information instructing the image processing device to obtain the second image data,
when the selected image processing is an image processing to compose the image displayed by the selected third image data with the image displayed by the first image data so as to create the second image data corresponding to a predetermined paper size, the determining includes determining the predetermined pixel size so as to be identical with a pixel size of an image corresponding to the predetermined paper size, and
the third instruction information includes information instructing the image processing device to print the second image data on a paper of the predetermined paper size.

16. The communication system according to claim 12, wherein
the computer-readable instructions, when executed by the processor, cause the relay device to further perform:
judging whether or not to execute a reduction processing to reduce a size of the first image data in the server device when the first processing is executed, and
sending, in association with the first instruction information, fifth instruction information instructing the server device to execute the reduction processing when it has been judged that the reduction processing is to be executed in the judging.

17. The communication system according to claim 16, wherein
the judging includes:
judging not to execute the reduction processing when the selected image processing is a processing to be executed on the first image data that was generated by a scanner comprised in the image processing; and
judging to execute the reduction processing when the selected image processing is a processing to be executed on the first image data that has been stored in a memory of the image processing device.

18. The communication system according to claim 12, wherein
the computer-readable instructions, when executed by the processor, cause the relay device to further perform:
receiving, from the image processing device via the network interface, third information identifying selected third image data,
the selected third image data being data selected from among a plurality of third image data and being to be composed with the first image data by the selected image processing; and
obtaining the selected third image data identified by the received third information,
the selecting of one of the first processing and the second processing includes:
selecting the first processing when the selected image processing is an image processing to compose the obtained selected third image data with the first image data; and
selecting the second processing when the selected image processing is another image processing than the image processing to compose the obtained selected third image data with the first image data.

19. The communication system according to claim 12, wherein
the relay device is located in a first geographical location, and
the sending of the first instruction information includes sending the first instruction information causing the image processing device to execute the first processing, the first processing being a processing to send the first image data to the relay device via the server device located in the second geographical location different from the first geographical location.

20. The communication system according to claim 12, wherein
the computer-readable instructions, when executed by the processor, cause the relay device to further perform:
selecting one of a third processing and a fourth processing based on at least one of the first information and the second information,
the third processing being a processing in which the relay device sends the second image data to the image processing device via the server device, and
the fourth processing being a processing in which the relay device sends the second image data to the image processing device not via the server device;
sending, to the image processing device, third instruction information instructing the image processing device to obtain the second image data from the relay device via the server device, when the third processing is selected; and
the relay device includes a first device and a second device,
the first device is configured to connect with the image processing device and the second device via the network,
the second device is configured to connect with the server device via the network,
the computer-readable instructions cause the first device to perform:
the receiving of the first information and the second information;
the selecting of one of the first processing and the second processing;
the sending of the first instruction information;
the sending of the second instruction information; and
the sending of the third instruction information, and the computer-readable instructions cause the second device to perform:
the receiving of the first image data; and
the generating of the second image data.

21. The communication system according to claim 20, wherein
the second device and the server device are connected by a virtual private network.

22. A communication system comprising a relay device, an image processing device and a server device, wherein
the image processing device performs sending first information and second information to the relay device,
the first information being information identifying a selected image processing,
the selected image processing being at least one type of image processing selected in the image processing device from among plural types of image processing that are to be executed on first image data outputted from the image processing device, and
the second information being information including plural kinds of information related to the image processing device;
the relay device performs:
receiving the first information and the second information from the image processing device,
selecting one of a first processing and a second processing based on at least one of the received first information and the received second information,
the first processing being a processing in which the image processing device sends the first image data to the relay device via the server device, and
the second processing being a processing in which the image processing device sends the first image data to the relay device not via the server device;
sending, to the image processing device, first instruction information causing the image processing device to execute the first processing when the first processing is selected; and
sending, to the image processing device, second instruction information causing the image processing device to execute the second processing when the second processing is selected,
the image processing device further performs:
receiving the first instruction information from the relay device; and
sending the first image data to the server device when the first instruction information is received,
the server device performs sending the first image data to the relay device when the first image data is received from the image processing device,
the image processing device further performs:
receiving the second instruction information from the relay device; and
sending the first image data to the relay device when the second instruction information is received from the relay device,
the relay device further performs:
receiving the first image data from the server device after the sending of the first instruction information, or receiving the first image data from the image processing device after the sending of the second instruction information;
generating second image data by executing the selected image processing on the first image data that has been received;
selecting one of a third processing and a fourth processing based on at least one of the first information and the second information,
the third processing being a processing in which the relay device sends the second image data to the image processing device via the server device, and
the fourth processing being a processing in which the relay device sends the second image data to the image processing device not via the server device;
sending, to the image processing device, third instruction information instructing the image processing device to obtain the second image data via the server device, when the third processing has been selected; and
sending, to the image processing device, fourth instruction information instructing the image processing device to obtain the second image data not via the server device, when the fourth processing has been selected,
the image processing device further performs:
receiving the third instruction information from the relay device;
receiving the second image data from the server device when the third instruction information is received;
receiving the fourth instruction information from the relay device; and
receiving the second image data from the relay device when the fourth instruction information is received.

* * * * *